# (12) United States Patent
Okamura et al.

(10) Patent No.: US 7,101,603 B2
(45) Date of Patent: Sep. 5, 2006

(54) KEY TOP PLATE

(75) Inventors: Tatsuya Okamura, Kanagawa (JP);
  Kimitane Kimura, Kanagawa (JP);
  Yasuo Kojima, Kanagawa (JP);
  Atsushi Hari, Kanagawa (JP); Shinji Mizuno, Kanagawa (JP)

(73) Assignee: Teikoku Tsushin Kogyo Co., Ltd., Kanagawa-Ken (JP)

( * ) Notice: Subject to any disclaimer, the term of this patent is extended or adjusted under 35 U.S.C. 154(b) by 0 days.

(21) Appl. No.: 11/071,451

(22) Filed: Mar. 4, 2005

(65) Prior Publication Data

US 2005/0145471 A1   Jul. 7, 2005

Related U.S. Application Data

(62) Division of application No. 10/073,283, filed on Feb. 13, 2002.

(30) Foreign Application Priority Data

| Feb. 20, 2001 | (JP) | ................ 2001/42926 |
| May 18, 2001 | (JP) | ............... 2001/149359 |
| Oct. 9, 2001 | (JP) | ............... 2001/311239 |
| Oct. 12, 2001 | (JP) | ............... 2001/315546 |

(51) Int. Cl.
  *B32B 1/04* (2006.01)
  *B32B 3/02* (2006.01)
  *B32B 3/10* (2006.01)
  *H01H 1/10* (2006.01)
  *H01H 13/14* (2006.01)

(52) U.S. Cl. ................ 428/139; 428/68; 428/71; 428/76; 428/166; 428/178; 200/512; 200/520

(58) Field of Classification Search ........... 428/195.1, 428/341, 520, 512, 517, 68, 71, 76, 132, 428/139, 166, 178; 200/512, 520
See application file for complete search history.

(56) References Cited

U.S. PATENT DOCUMENTS

| 5,280,146 A | 1/1994 | Inagaki et al. |
| 5,399,821 A | 3/1995 | Inagaki et al. |
| 5,475,192 A | 12/1995 | Inagaki et al. |
| 5,613,599 A | 3/1997 | Inagaki et al. |
| 6,621,027 B1 | 9/2003 | Shimizu et al. |

FOREIGN PATENT DOCUMENTS

| EP | 0616345 | 10/1993 |
| JP | 60-115287 | 8/1985 |
| JP | 8-7698 | 1/1996 |
| JP | 10-119058 | 5/1998 |
| JP | 10-162689 | 6/1998 |
| JP | 11-66997 | 3/1999 |
| JP | 2001-148214 | 5/2001 |
| JP | 2002-197933 | 7/2002 |

*Primary Examiner*—Rena Dye
*Assistant Examiner*—Lawrence Ferguson
(74) *Attorney, Agent, or Firm*—Wenderoth, Lind & Ponack, L.L.P.

(57) ABSTRACT

A first film plate 20 and a second film plate 40, each made of flexible resin film, are attached to a top surface and a bottom surface of a key top 30 made of mold-resin, respectively, so as to cover the key top 30. The first film plate 20 is pressed upward to form a recessed portion 23, the key top 30 is molded within this recessed portion 23. The second film plate 40 is arranged on the bottom surface of the key top 30. All of the first film plate 20, the key top 30, and the second film plate 40 are transparent. Decorative layers 21 and 41 are formed on the first film plate 20 and the second film plate 40, respectively.

14 Claims, 22 Drawing Sheets

Fig.3(a-1)
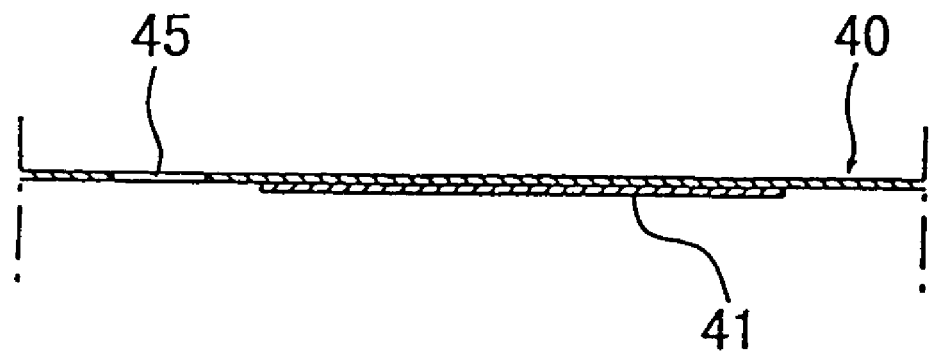
Fig.3(a-2)
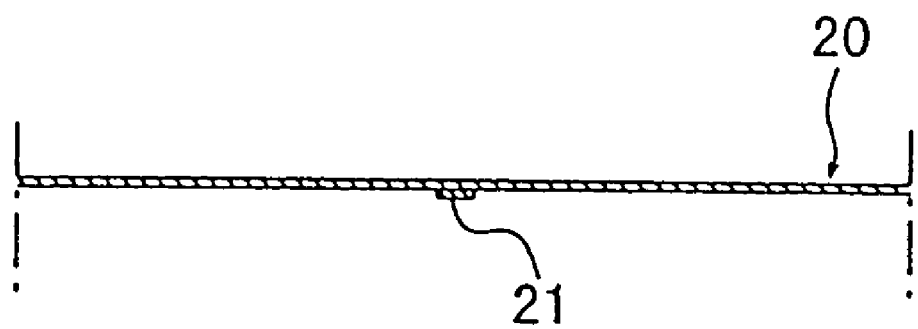

Fig.3(b-1)
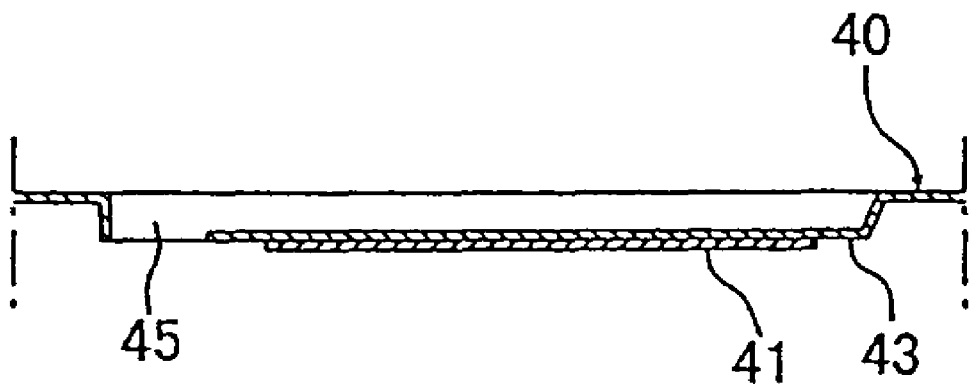
Fig.3(b-2)
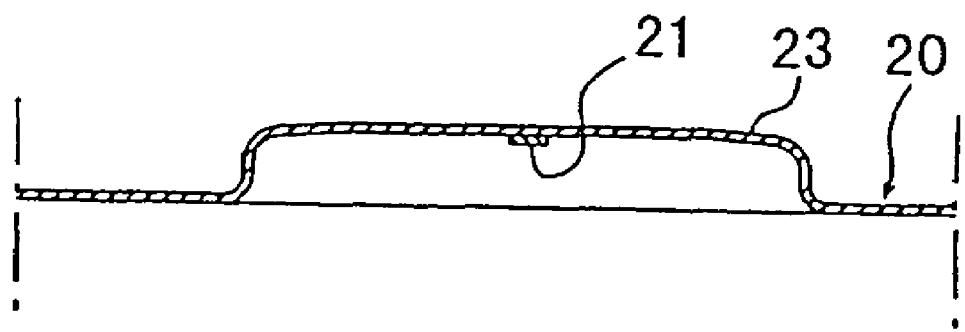

PRIOR ART

Fig.14(a)
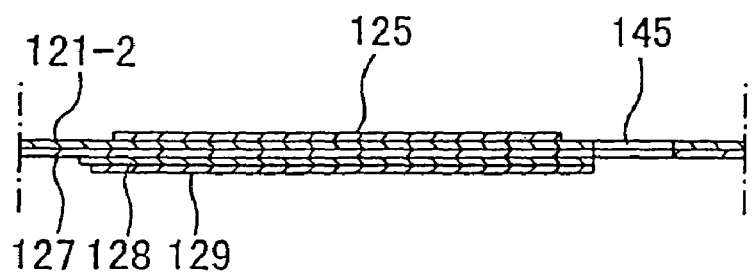
Fig.14(b-1)
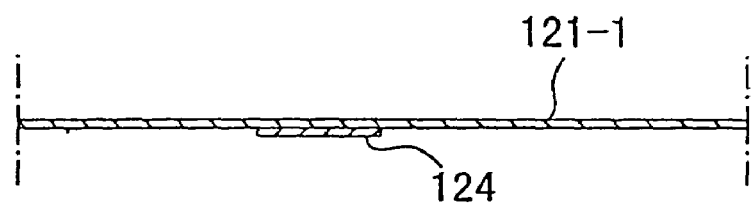
Fig.14(b-2)
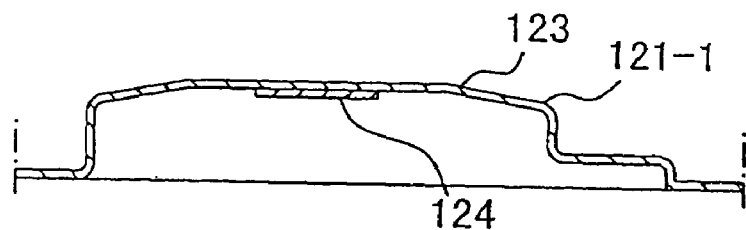

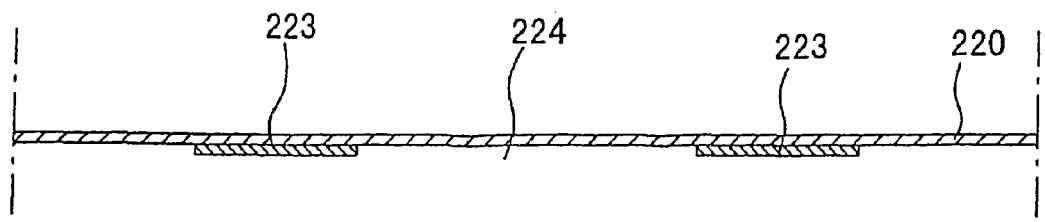
Fig.16(a-1)
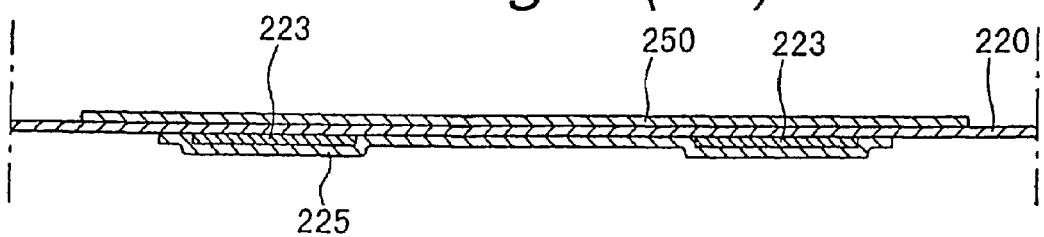
Fig.16(a-2)
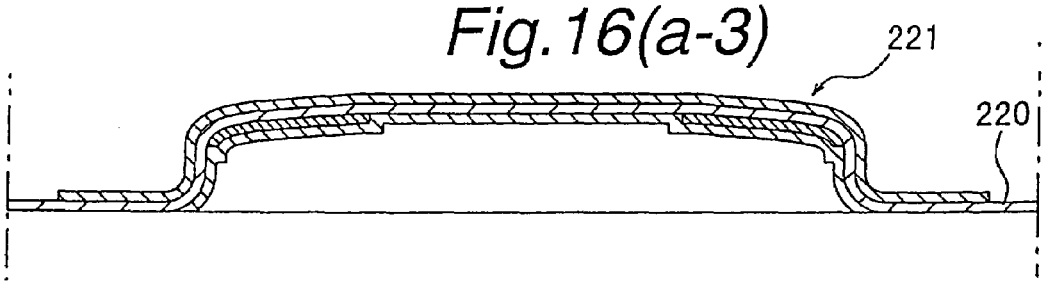
Fig.16(a-3)
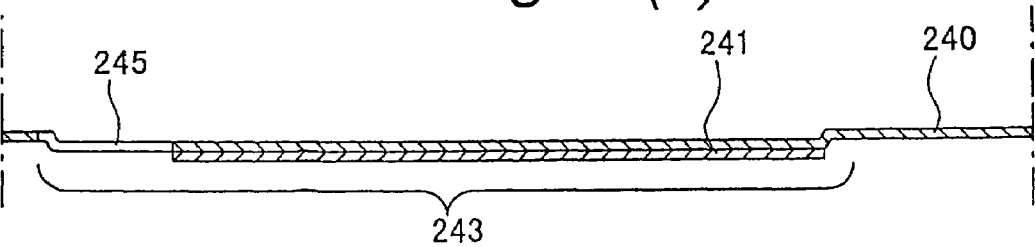
Fig.16(b)

KEY TOP PLATE

This is a divisional application of U.S. patent application Ser. No. 10/073,283, filed Feb. 13, 2002 currently pending.

BACKGROUND OF THE INVENTION

The present invention relates to a key top plate which is preferably applied to a push-button switch used in a variety of electronic devices and also to a method of manufacturing the key top plate.

Heretofore, such a key top plate has been developed in order to make it smaller and thinner that comprises a film plate made of resin film and a key top of mold-resin molded on the film plate. In particular, a specific type of key top plate has been developed that further comprises a print layer including graphic form or the like printed on an under surface of a transparent key top, wherein the print layer is illuminated by an illumination means arranged beneath the layer.

FIG. 5 is a schematic sectional view illustrating a principal part of such a conventional key top plate 300 including one of the key tops 311 thereof. It is to be noted that the actual key top plate 300 includes a lot of key tops 311. The key top plate 300 shown in FIG. 5 has been configured in such a way that a predetermined portion of a film plate 301 made of flexible transparent resin film is pressed upwardly to form a recessed portion 303, the key top 311 made of transparent mold-resin is molded within this recessed portion 303, and then a print layer 313 including desired character, graphic form or symbol is indicatively formed on a flat under surface of the key top 311.

When the key top plate 300 is illuminated from an under side thereof by an illumination means, though not shown, color and/or character of the print layer 313 attached onto the under surface of the key top 311 can be displayed clearly on a top surface side of the key top 311 so as to give a high-class appearance to the key top 311.

In the above conventional example, if, for example, the character or the like is to be printed on a solid print for background in the form of single-color print over a sheet in order to further enhance the high-class appearance, the solid print and the print of the character or the like have been provided in a double-layer as placing one on the other in the section same plane when the character or the like is printed directly over the solid print for the background, the character would not look as embossed or as if floating above the ground, resulting in failure to provide the enhanced high-class appearance.

Besides, in the above example of the prior art, since the key top 311 is simply attached on the under surface of the recessed portion 303 of the film plate 301, there is still a fear that the key top 311 may be detached from the film plate 301 in case of bad adhesion.

On the other hand, there has been an alternative case where the print layer is formed in the location of the recessed portion 303 of the film plate 301, instead of the print layer 313 being formed on the under surface of the key top 311. In this case, the screen printing method has been typically used as a means for printing this print layer.

However, the conventional screen printing method has imposed a limitation on color scheme. In other words, reproducing a peculiar color tone (e.g., a metallic color tone or a pastel color tone) is difficult and, for example, a photo-image like printing represented by many different colors with fine texture has been difficult.

On the other hand, another type of key top having a different configuration has also been proposed, in which a print layer including a desired coloring is arranged on the top surface of the key top so as to decorate it. Furthermore, an area without a print layer is arranged in a central portion of the print layer so as to allow the inside of the transparent key top to be seen though, thereby improving the aesthetic appearance in design. In addition, in the key top of such configuration, the one that can be manufactured in a simple manner with low cost has been desired.

SUMMARY OF THE INVENTION

Accordingly, an object of the present invention is to provide a key top plate which can simplify the fabrication of such a key top that enables a character or the like to be seen as embossed or floating over a display of a background or the like.

Another object of the present invention is to provide a key top plate which is free from a fear that a key top will be detached from a film plate even if the key top plate employs a configuration in which the film plate covers the top surface of the key top.

Still another object of the present invention is to provide a key top plate which facilitates a photo-image like printing represented by many different colors with fine texture.

Yet still another object of the present invention is to provide a key top plate which can be manufactured in a simple manner with low cost even if a key top employs a configuration in which a decorative layer including a desired coloring is arranged on a top surface of the key top so as to decorate it, and even if an area without a decorative layer is arranged in a central portion of the decorative layer so as to allow the inside of the transparent key top to be seen though.

An aspect of the present invention is directed to a key top plate, in which a first film plate and a second film plate, each being made of flexible resin film, are attached on a top surface and an under surface of a key top made of mold resin, respectively, so as to cover the key top. This can eliminate a fear that the key top will be detached from the film plate even without any other special fixing means provided therein.

Another aspect of the present invention is characterized in that the first film plate is pressed upwardly to form a recessed portion, the key top is molded within the recessed portion, and the second film plate is disposed on the under surface side of the key top.

Still another aspect of the present invention is characterized in that the first film plate and the key top are both transparent, and a decorative layer is formed on the first film plate and/or the second film plate.

When both the first and the second film layers are provided with the decorative layers, the decorative layer placed on the key top can be displayed in three-dimensions above the decorative layer placed beneath the key top with a perspective condition, thereby providing a high-class appearance to the display. In particular, if the decorative layer to be disposed on the top surface side of the key top includes a character, a graphical form or a symbol and the decorative layer to be disposed on the under surface side is constituted of a solid display for a background, then such a key top can be readily formed that has a high-class appearance with the character or the like seen floating over the background in three dimensions. Alternatively, if both of the upper and the lower decorative layers include characters, graphical forms or symbols, then between two kinds of characters, graphical forms or symbols indicated in the same key top, a three-dimensional effect can be created in the relation between the upper and the lower characters, graphical forms or symbols, so that the upper character, graphical form or symbol can be high-lighted and thus discriminated from the lower character, graphical form or symbol.

Still another aspect of the present invention is characterized in that a portion of the second film plate which is in contact with the key top is protruded downward from a peripheral portion of the key top, which is out of contact with the key top.

Still another aspect of the present invention is characterized in that a portion of the second film plate, which is in contact with the key top, is made flat so as to be flush with a peripheral portion of the key top, which is out of contact with the key top.

Still another aspect of the present invention is directed to a key top plate in which a film plate made of transparent flexible resin film is pressed upwardly to form a recessed portion, and a key top made of transparent mold-resin is molded within the recessed portion. A decorative layer is formed on the film plate, and another decorative layer is disposed on an under surface side of the key top.

With the decorative layers arranged on both of the top and the under surfaces of the key top as described above, the upper decorative layer can be displayed in three-dimensions above the lower decorative layer with a perspective condition, thereby providing a high-class appearance to the display. In particular, if the decorative layer to be disposed on the top surface side of the key top includes a character, a graphical form or a symbol and the decorative layer to be disposed on the under surface side is constituted of a solid display for a background, then such a key top can be readily formed that has a high-class appearance with the character or the like seen floating over the background in three dimensions. Alternatively, if both the upper and the lower decorative layers include characters, graphical forms or symbols, then between two kinds of characters, graphical forms or symbols indicated in the same key top, a three-dimensional effect can be created in the relation between the upper and the lower characters, graphical forms or symbols, so that the upper character, graphical form or symbol can be high-lighted and thus discriminated from the lower character, graphical form or symbol.

Still another aspect of the present invention is characterized in that the decorative layer is a print layer printed by way of flexographic printing, offset printing, gravure printing, printing with a laser printer, printing with an ink jet printer, or printing with a thermo-transfer printer. With use of such printing means as above, a photo-image like printing with many different colors and fine texture can be easily realized.

Still another aspect of the present invention is characterized in that a coating layer for improving a fixing property of printing ink is formed on a surface of the resin film, on which the decorative layer is to be arranged. This facilitates and ensures the printing thereon.

Still another aspect of the present invention is characterized in that the decorative layer consists of deposition film. This provides a decorative layer with a mirror surface. The decorative layer consisting of the deposition layer can be manufactured simply by selectively etching the deposition film on the film plate, which has been made by forming the deposition film covering the entire area of the film plate, to a predetermined shape. Therefore, the decorative layer with the mirror surface may be manufactured much easier as compared with the case of plating.

Still another aspect of the present invention is characterized in that the decorative layer is arranged on the first film plate, wherein a key top exposing section is provided in the decorative layer. The key top exposing section includes no decorative layer so as to allow an inside of the key top to be seen through. With this configuration, the key top having such a structure can be easily manufactured that includes, in a single key top, a top surface decorative section by way of the decorative layer and a transparent section allowing the interior of the key top to be seen through.

Still another aspect of the present invention is characterized in that the decorative layer is also arranged on the second film plate. This increases the decorative effect.

Yet still another aspect of the present invention is directed to a method of manufacturing a key top plate comprising clamping a first film plate and a second film plate placed one on another, each being made of flexible transparent resin film, between a first die having a cavity for forming a shape of an upper portion of a key top and a second die having a cavity for forming a shape of a lower portion of the key top. The cavities within the first and the second dies are filled by injecting molten mold-resin between the first and the second film plates. The key top plate is taken out by removing the first and the second dies after the molten resin has been set.

BRIEF DESCRIPTION OF THE DRAWINGS

FIG. 1 shows a principal part of a key top plate 10 according to a first embodiment of the present invention, wherein

FIG. 3(a-1), FIG. 3(a-2), FIG. 3(b-1), FIG. 3(b-2)

FIG. 7 shows a key top plate 10-2 according to a second embodiment of the present invention, wherein

FIG. 14(a), FIG. 14(b-1), FIG. 14(b-2)

FIG. 15 is an enlarged schematic view of a principal part of the key top plate 10 showing one of the key tops 30 and surroundings thereof, according to a fourth embodiment of the present invention, wherein

FIG. 16(a-1), FIG. 16(a-2), FIG. 16(a-3), FIG. 16(b) and FIG. 16(c) are sectional views illustrating a method of manufacturing the key top plate 10.

DETAILED DESCRIPTION OF THE INVENTION

Preferred embodiments of the present invention will now be described with reference to the attached drawings.

FIRST EMBODIMENT

Figure 1A:
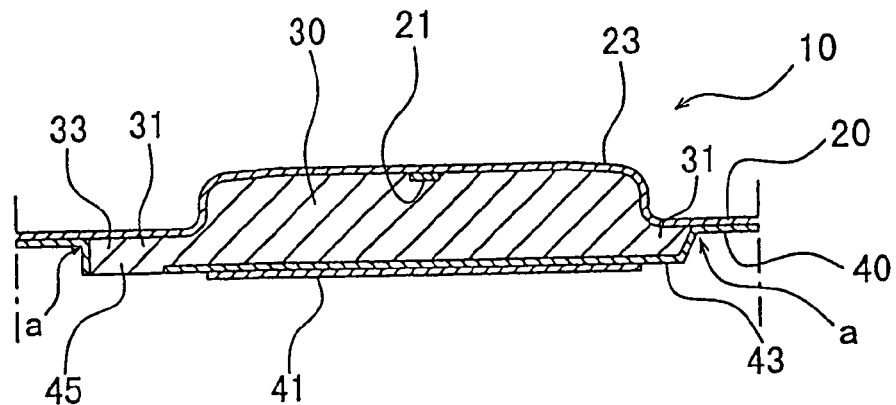
FIG. 1(a) is a schematic sectional view (taken along the line A—A of FIG. 1(b)) and FIG. 1(b) is a plan view.
Figure 1B:
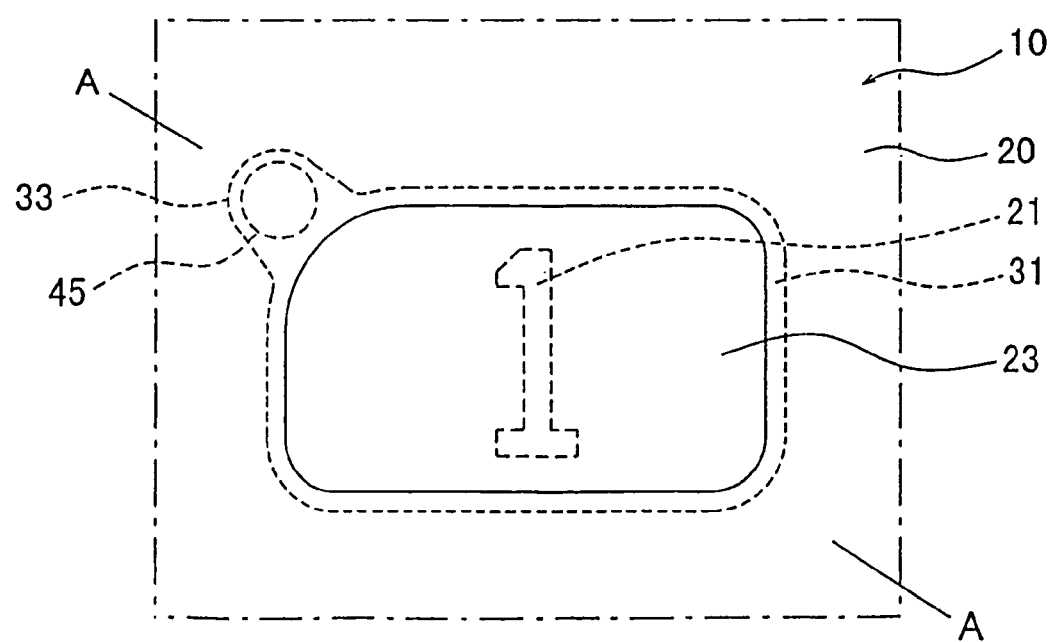

FIG. 1 is a schematic diagram of a principal part of a key top plate 10 showing one of the key tops 30 and surroundings thereof, according to a first embodiment of the present invention, wherein FIG. 1(a) is a schematic sectional view (a sectional view taken along the line A—A of FIG. 1(b)) and FIG. 1(b) is a plan view. It is to be appreciated that the actual key top plate 10 includes a plurality of key tops 30. As shown in FIG. 1, this key top plate 10 has been configured in such a way that a first film plate 20 is pressed upwardly to form a recessed portion 23, a key top 30 made of mold-resin is molded within this recessed portion 23, and a second film plate 40 is arranged on a bottom surface of the key top 30. In other words, this key top plate 10 has a configuration in which the first film plate 20 and the second film plate 40 are attached, respectively, to the top surface and the bottom surface of the key top 30 made of mold-resin so as to encapsulate the key top 30. In addition, the first and the second film plates 20 and 40 are provided with decorative layers 21 and 41, respectively, (which are hereafter referred to as "print layers" in this embodiment and some other embodiments). Each of the components will now be described below.

The first film plate 20 is made of a transparent resin film having flexibility, and a polyethylene terephthalate film is employed in this embodiment. Of course, other resin films made of a variety of materials may be used. Herein, a portion of the first film covering the key top 30 is formed into the recessed portion 23 with the same shape as that of the top surface of the key top 30, and the print layer 21 is printed on a bottom surface of the recessed portion 23. This print layer 21 may include, for example, a character, a graphic form, a symbol or the like. In practice, an adhesive material layer is provided on the bottom surface side of the print layer 21, though it is omitted in the drawing.

The second film plate 40 is made of a transparent resin film having flexibility, and a polycarbonate film is employed in this embodiment. Of course, other resin films made of a variety of materials may be used. Herein, a portion of the second film plate 40 which is to be in contact with the key top 30 (in particular, an inner area located under the key top 30 including a flange portion 31) protrudes downward from a peripheral portion thereof surrounding the key top 30 and is to be out of contact therewith (in particular, a peripheral area designated as "a" in the drawing for connecting the first film plate 20 and the second film plate 40, located in an outer side of the key top 30) to form a recessed portion 43 for receiving a contact portion of the key top 30, and a print layer 41 is printed on an under surface of the recessed portion 41. This print layer 41 may be printed as, for example, a solid print for a background (a print using only one color and applied over almost the entire under surface of the key top 30) with a suitable color (e.g., white) and thickness so as to allow light transmission. A through hole 45 is arranged in a corner portion of the recessed portion 43.

The key top 30 made of transparent thermoplastic material, and a polycarbonate resin is employed in this embodiment Of course, other mold-resin made of variety of materials may be used. The flange portion 31 is arranged so as to overhang (extend) approximately annularly from a lower circumferential portion of the key top 30 outwardly. It is to be noted that a protrusion 33 in the shape of a tongue tip protrudes from a corner of the flange portion 31, with the through hole 45 of the second film plate 40 located below the protrusion 33.

Further, a switch contact is disposed beneath the key top 30, though not shown, on which the key top 30 is pressed so that the switch contact is turned on. On the other hand, if a light emitting means (such as a light emitting diode) is disposed beneath the key top plate 10, and the light from that is guided to the key top 30, then the print layers 21 and 41 printed on the first and the second film plates 20 and 40 are illuminated through the transparent second film plate 40, the key top 30 and the first film plate 20 so as to emerge brightly on the top surface of the key top plate 10. Since in the present invention the two print layers 21 and 41 are spaced apart from each other, the character, graphic form or the like of the print layer 21 may be seen as if it was floating in a three-dimensional structure against the background of the print layer 41, thus succeeding in providing a spatial effect and a high-class appearance.

Still further, with the configuration in this embodiment, in which the key top 30 made of mold-resin has been covered with the first film plate 20 and the second film plate 40, there would be no fear that the key top 30 will be removed from the first and the second film plates 20 and 40.

It is to be noted that in this embodiment, the lower part of the key top 30 including the flange portion 31 is designed to be accommodated in the recessed portion 43 of the second film plate 40 such that the top surface (the upper surface) of the flange portion 31 can be flush with the top surface (the upper surface) of the second film plate 40 at the outer periphery of the key top 30. In other words, the recessed portion 43 has been formed with an appropriate depth such that the top surface (the upper surface) of the flange portion 31 is flush with the top surface (the upper surface) of the second film plate 40 in the outer side of the key top 30.

Figure 2:
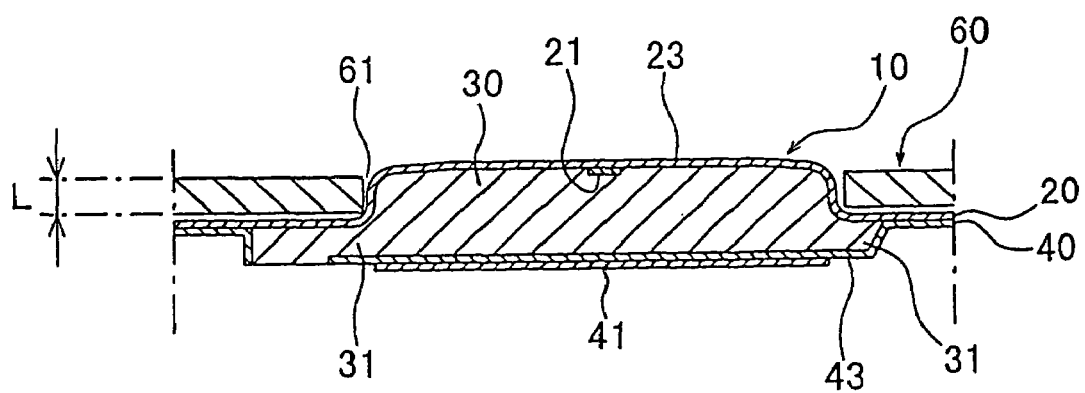
FIG. 2 is a schematic sectional view of a key top plate 10 disposed under a case 60.

With such a configuration of the key top plate 10, when a case 60 is placed over the key top plate 10 with the key top 30 protruding through a through hole 61 formed in the case 60 as shown in FIG. 2, only an area defining the flange portion 31 protrudes from the bottom surface of the case 60 because the top surface of the flange portion 31 is flush with the top surface of the second film plate 40, and the other area of the key top plate 10 having no flange portion 31 has a thickness equivalent to a total thickness of the case 60 plus the first and the second film plates 20, 40. Therefore, a profile of the entire unit including the case 60 and the key top plate 10 can be made low, so that electronic devices with a low-profile can be achieved by using this key top plate 10. It is to be noted that the recessed portion 43 is not necessarily provided if such a low-profile effect is not desired.

A method of fabricating this key top plate 10 will now be explained. FIG. 3 is a diagram showing a method for manufacturing the key top plate 10. First, as shown in FIG. 3(a-1), on the under surface of the second film plate 40 the print layer 41 is printed, for example, in the form of a solid print having a color and a thickness that allows light transmission therethrough. Next, the through hole 45 is formed in a predetermined location of the second film plate 40.

Then, a portion of the second film plate 40 with which the bottom surface of the key top 30 is to come into contact is processed by a drawing press using a die to form the recessed portion 43, as shown in FIG. 3(b-1). The shape of the recessed portion 43 is identical to that of the bottom surface of the key top 30 including the flange portion 31, and the depth of the recessed portion 43 is identical with the thickness of the flange portion 31.

On the other hand, the print layer 21 including, for example, a character, a graphical form, a symbol or the like, is printed on the bottom surface of the first film plate 20 as shown in FIG. 3(a-2). Further, on the bottom surface side of the print layer 21, an adhesive material layer is printed (though not shown) over such an entire area thereof that is to be formed into the recessed portion 23 in the subsequent process.

In the next step as shown in FIG. 3(b-2), the drawing press is applied to the first film plate 20 by using a die to deform the plate 20 upwardly and thus to form the recessed portion 23. The shape of the recessed portion 23 is made to be approximately identical with the shape of the top surface of the key top 30 (not necessarily made exactly identical therewith but may have a height approximate to one half of a depth of a cavity 71 of a die 70, for example, which will be described later).

Figure 3C:
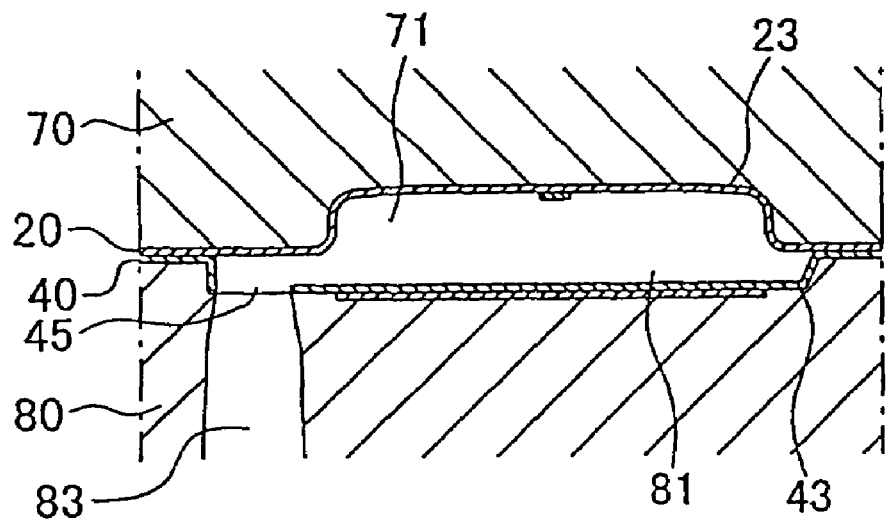
FIG. 3(c) and FIG. 3(d) are sectional views illustrating a method of manufacturing a key top plate 10.

Subsequently, after the first and the second film plates 20 and 40, which have been processed respectively with the drawing press described above, are laid with one placed on the other, the integral unit is clamped between the first and the second dies 70 and 80, as shown in FIG. 3(c). Herein, the first die 70 is provided with the cavity 71 which has been formed into a shape to accommodate the recessed portion 23 of the first film plate 20 (i.e., a shape identical with that of the upper portion of the key top 30). On the other hand, the second die 80 is provided with the cavity 81 which has been formed into a shape to accommodate the recessed portion 43 of the second film plate 40 (i.e., a shape identical with that of the lower portion of the key top 30), and also is provided with a pin gate 83 which is arranged in a location to be joined with the through hole 45 of the second film plate 40.

In this condition, molten resin is injected from the pin gate 83 so as to fill up the space within the two cavities 71 and 81 of the first and the second dies 70 and 80 with the molten resin. Then the first and the second dies 70 and 80 are removed after the molten resin has been set, to produce a completed product of the key top plate 10.

It is to be appreciated that in the above embodiment, the adhesive material layer printed on the bottom surface of the recessed portion 23 works for establishing the bonding between the first film plate 20 and the key top 30, while both the second film plate 40 and the key top 30 are made of polycarbonate so that the heat and pressure from the molten resin enables the two parts to be bonded with each other without using any adhesive materials.

Figure 3D:
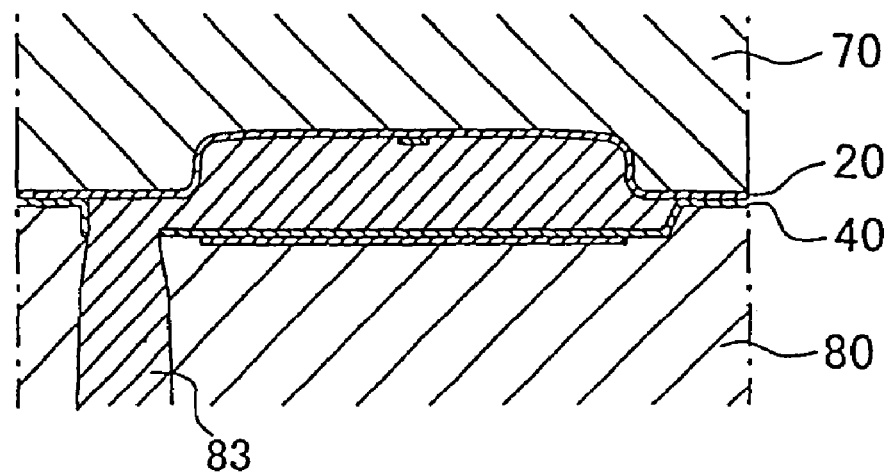
Figure 4:
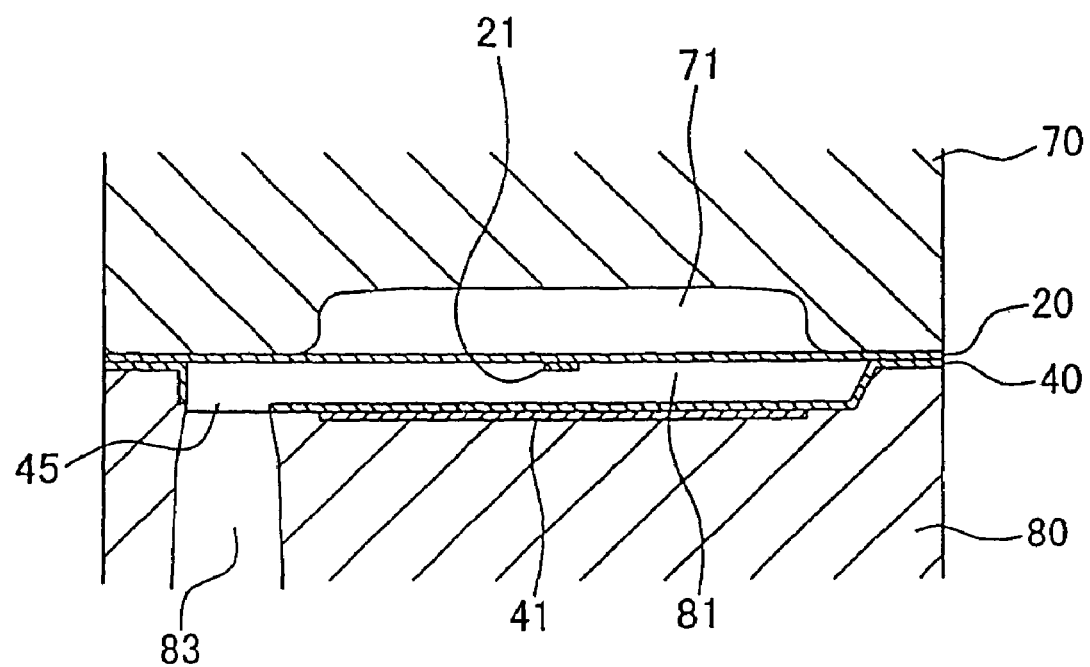
FIG. 4 is an explanatory sectional view showing an alternative method of manufacturing a key top 10.

It is to be also appreciated that a variety of methods may be used to fabricate the key top plate 10, including, for example, such a method as shown in FIG. 4, in which the first film plate 20 has not been subjected to the drawing process but is clamped between the first and the second dies 70, 80 as a flat plate as shown in FIG. (3a-2_. When the molten resin is injected from the pin gate 83 to fill up the space within the two cavities 71, 81 of the first and the second dies 70, 80 with the molten resin, the heat and pressure from the molted resin work to deform the first film plate 20 along the inner wall contour of the cavity 71 and thus to form the plate 20 into the profile as shown in FIG. 3(d).

Further, although in the above embodiment the print layers 21 and 41 have been disposed on the bottom surfaces of the first and the second film plates 20 and 40, respectively, either of them may be disposed on the top surface of either plate. However, it is preferable for the first film plate 20 that the print layer 21 should be displayed on the bottom surface thereof because this configuration ensures that the stripping-off of the print layer 21 due to abrasion can be prevented.

Figure 5:
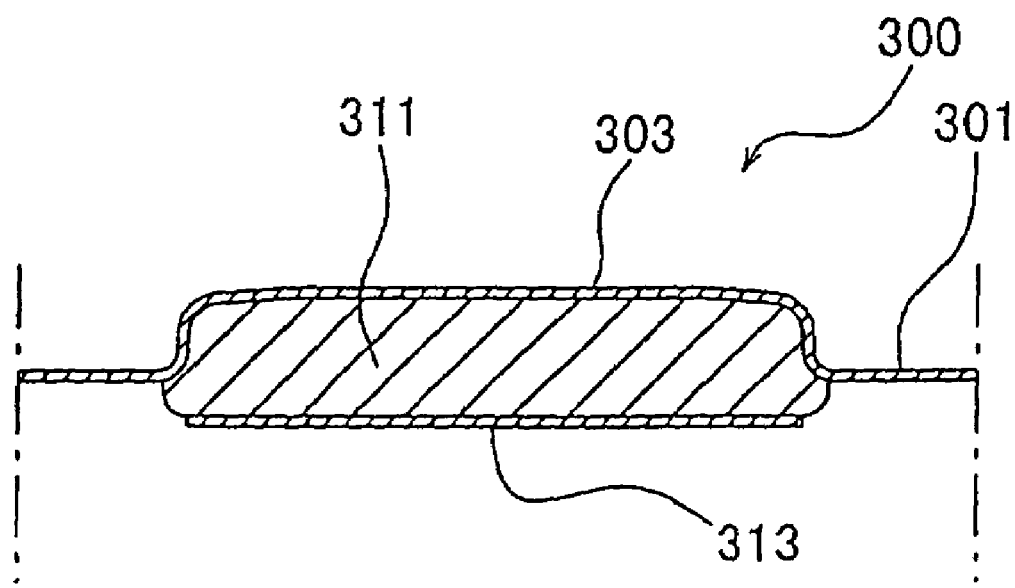
FIG. 5 is a schematic sectional view showing a portion including one of the key tops 311 of a key top plate 300 according to a prior art.

Still further, although the key top 30 has been covered with the first and the second film plates 20 and 40 in the configuration of the above embodiments, the second film plate 40 on the lower side may be omitted. In that case, the print layer 41 may be printed directly on the bottom surface of the key top 30. That is such a configuration as shown in FIG. 5, in which a print layer 313 is disposed on a bottom surface of a key top 311, and a print layer is disposed on a bottom surface or a top surface of a recessed portion of a film plate 303. In the configuration in which the print layer is printed directly on the bottom surface of the key top, however, more labor hours would be necessary to print the print layer on every one of those many key tops mounted on a single key top plate, and it also would be difficult to maintain an appropriate level of precision. In contrast to this, in the case of using the second film plate 40, the print layers 41 may be easily formed all at once in a plurality of locations on the second film plate 40 where the key tops are to be molded, thereby facilitating the print display.

Yet further, although in the above embodiments the print layer 21 has been designated as the character, the graphical from or the like and the print layer 41 has been designated as the solid print for the background, it is needless to say that the condition of the print may be varied in many different ways. In addition, the print layer has been employed as a decorative layer in the above embodiments, but a decorative layer other than the print layer may be used, including, for example, a deposition layer formed by a deposition means.

Figure 6:
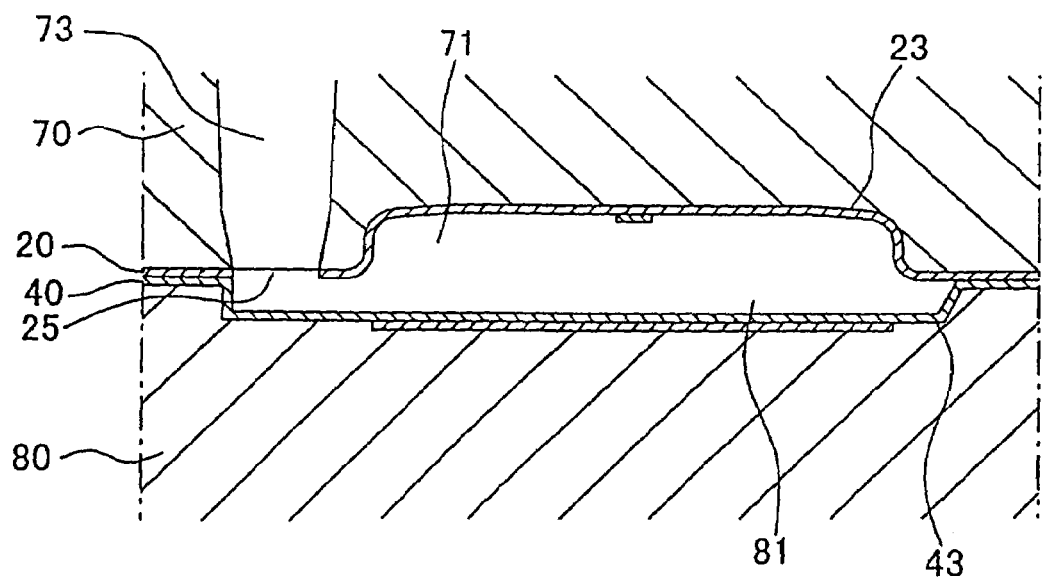
FIG. 6 is a sectional view illustrating an alternative method for manufacturing a key top plate 10.

In the configuration of the above embodiments, the pin gate 83 has been arranged in the second die 80 side so as to inject the molten resin from the through hole 45 formed in the second film plate 40 into the space within the cavities 71, 81. However, a pin gate 73 may be arranged in the first die 70 as shown in FIG. 6 and, in that case, the molten resin may be injected through the through hole 25 formed in the first film plate 20 into the space within the cavities 71, 81.

It is to be noted that the print layers 21 and 41 are not necessarily provided only for the purpose of preventing the key top 30 from dropping.

In the above embodiments, the adhesive material has been used to establish an effective fixing of the key top 30 to the first and the second film plates 20 and 40, but an alternative configuration may be employed. In particular, a hole can be formed in the first film plate 20 and/or the second film plate 40 to partially guide the mold-resin for forming the key top 30 to the opposite side of the film plate via this hole, so that the mold-resin which has reached the opposite side and the key top 30 together clamp the first film plate 20 and/or the second film plate 40 and thereby provide a mechanical fixing therebetween.

SECOND EMBODIMENT

Figure 7A:
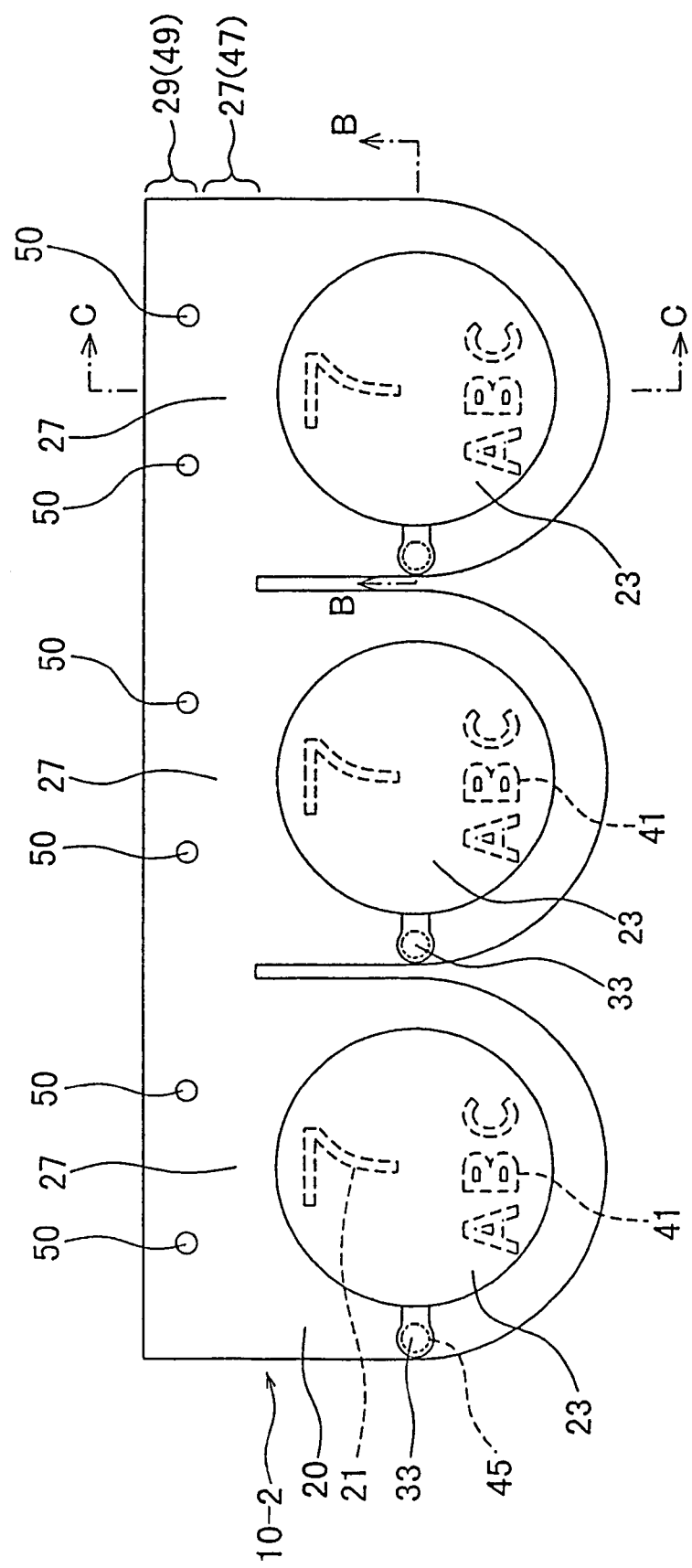
FIG. 7(a) is a plan view.
Figure 7B:
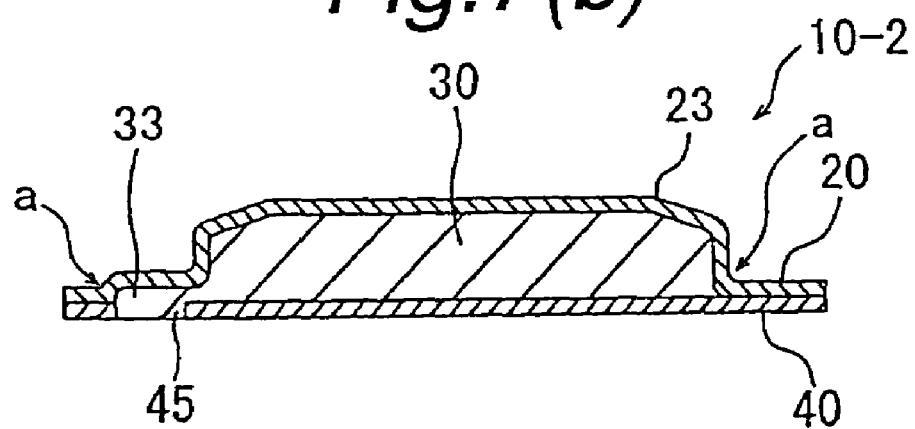
FIG. 7(b) is a sectional view taken along the line B—B of FIG. 7(a)
Figure 7C:
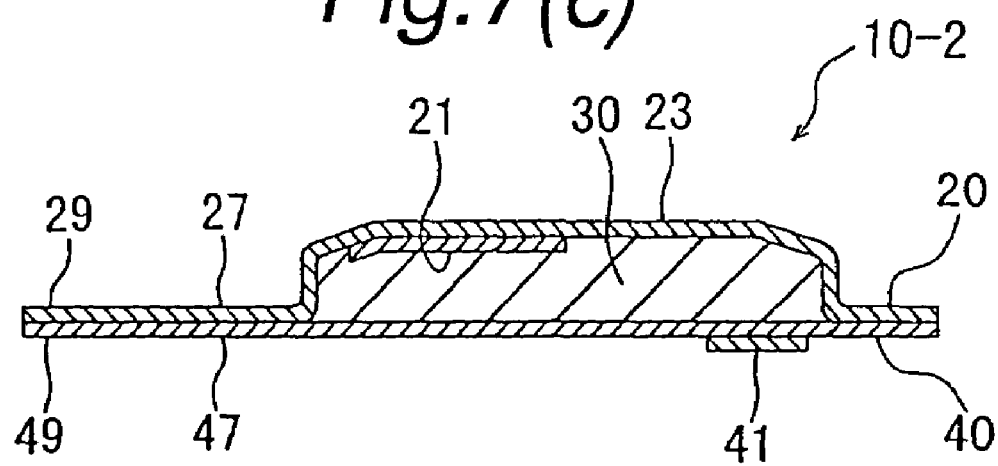
FIG. 7(c) is a sectional view taken along the line C—C of FIG. 7(a)

FIG. 7 shows a key top plate 10-2 according to a second embodiment of the present invention, wherein FIG. 7(a) is a plan view, FIG. 7(b) is a sectional view taken along the line B—B of FIG. 7(a), and FIG. 7(c) is another sectional view taken along the line C—C of FIG. 7(a). In FIG. 7, the same reference numerals are given to the same or similar components as those shown in FIG. 1, and the explanations thereof will be omitted. This key top plate 10-2 is identical with the key top plate 10 of FIG. 1 in the point that the key top 30 is formed within the recessed portion 23 formed in the first film plate 20 and further the second film plate 40 is disposed on the bottom surface side of the key top 30. Thus, a configuration in which the first and the second film plates 20 and 40 are mounted on the top and the bottom surfaces of the key top 30, respectively, so as to encapsulate the key top 30 is achieved. However, there are some differences between this embodiment and the aforementioned first embodiment, as will be described below.

Figure 8:
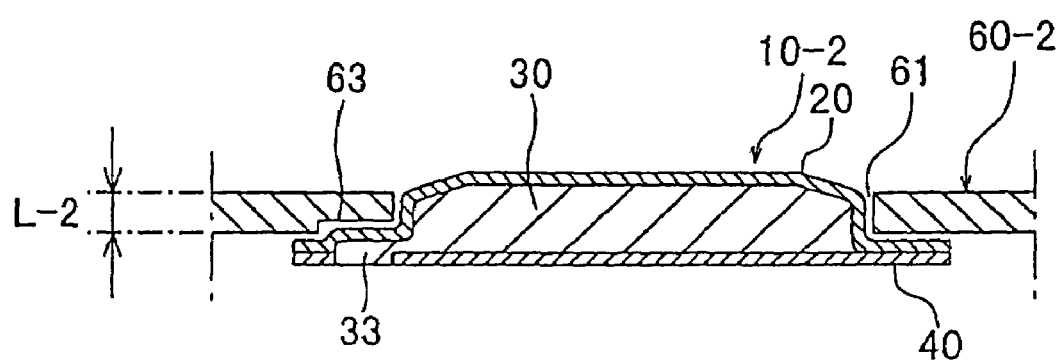
FIG. 8 is a schematic sectional view of a key top plate 10-2 disposed under a case 60-2.

A primary different point is that in this embodiment, a central area (surface) of the second film plate 40 which is in contact with the key top 30 is formed in a planar shape so as to be flush with a peripheral area (surface) of the film plate 40 which is located outside the periphery of the key top 30 and is out of contact with the key top 30 as shown in FIG. 7(b) and FIG. 7(c). Due to this configuration, a protrusion 33 is formed by protruding upward the first film plate 20 above the peripheral area thereof surrounding the key top 30 (in particular, a connecting portion "a" of the first film plate 20 and the second film plate 40 located outside of the key top 30). It is to be noted that in this embodiment, the flange portion 31 of the key top 30 shown in FIG. 1 is omitted, and if the flange portion 31 is to be provided, then the first film plate 20 may be deformed. Further, when a case 60-2 is placed on the key top plate 10-2 as shown in FIG. 8, a recessed portion 63 should be formed in the case 60-2 to accommodate the protrusion 33. In this case, if the thickness of the portion of the case 60-2 provided with the recessed portion 63 is determined to be enough to maintain the strength, then the thickness L-2 of the other portion of the case 60-2 may become relatively thicker. That is, the thickness L-2 of the case 60-2 becomes thicker as compared to the thickness L of the case 60 shown in FIG. 2 (in other word, the thickness of the case 60 shown in FIG. 2 can be made thinner as compared to that achieved in the second embodiment). In contrast therewith, however, with the configuration according to the second embodiment, the thickness of the portion of the key top 30 which protrudes from the bottom surface of the case 60-2 can be made thinner, so that the distance from the bottom surface of the case 60-2 to a surface of a switch substrate to be arranged under the case 60-2, though not shown, can be made shorter. Accordingly, this configuration can satisfy such a requirement, if any, that this distance should be reduced rather than the thickness L-2 of the case 60-2. Further, with this configuration, the drawing process for forming such a recessed portion 43 in the second film plate 40 as shown in FIG. 1 is no longer necessary, thus facilitating a simplified fabrication process and a reduced cost.

A second different point is that in the key top plate 10-2, the print layer (the decorative layer) 21 formed on the first film plate 20 and the print layer (the decorative layer) 41 formed on the second film plate 40 are both represented in the form of a character, a graphical form or a symbol. With this configuration, an interaction of two characters or graphical forms or symbols displayed in the same key top 30 provides a three-dimensional appearance between one character, graphical form or symbol by the upper print layer 21 and the other character, graphical form or symbol by the lower print layer 41. Therefore, preferably the character, graphical form or symbol by the upper print layer 21 can be highlighted and thus discriminated from the other character, graphical form or symbol by the lower print layer 41.

A third different point is that the first and the second film plates 20 and 40 of the key top plate 10-2 are provided with hinge sections 27 and 47, respectively, which are extended outward from the sections covering the key top 30. In the far side of the hinge sections 27 and 47, fixing section 29 and 49 are arranged so as to secure the key top plate 10-2 to another member. Each of the fixing section 29 and 49 function to couple three hinges 27 and 47 serially, and three pairs of fixing holes 50 are formed in respective locations each corresponding to each hinge sections 27, 47. With such configuration as described above, the key top plate 10-2 accomplishes an extended life-time, a reduced profile and a reduced size in length as compared to the key top plate with the hinge section formed by molding.

It is to be appreciated that in the above embodiment, the hinge sections 27 and 47 extend from both of the first and the second film plates 20 and 40, respectively, but the hinge section may be arranged exclusively in either one of the film plates. Also in this embodiment, the second film plate 40 disposed in the lower side may be omitted. However, if there is a fear that the repeated press actions may weaken the adhesive strength of the first film plate 20 to the key top 30 and may cause the key top 30 to drop away, then it is still preferred that the second film plate 40 be provided.

THIRD EMBODIMENT

Figure 9:
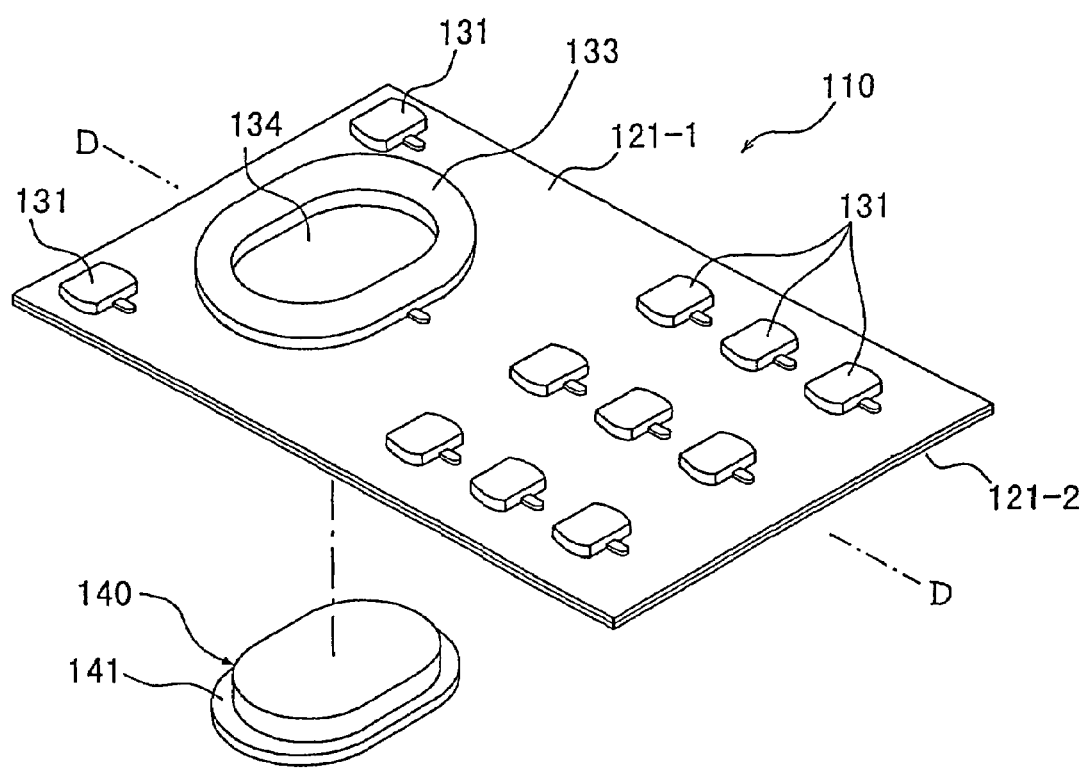
FIG. 9 is a perspective view of a key top plate 110 to which a third embodiment of the present invention is applied.
Figure 10:
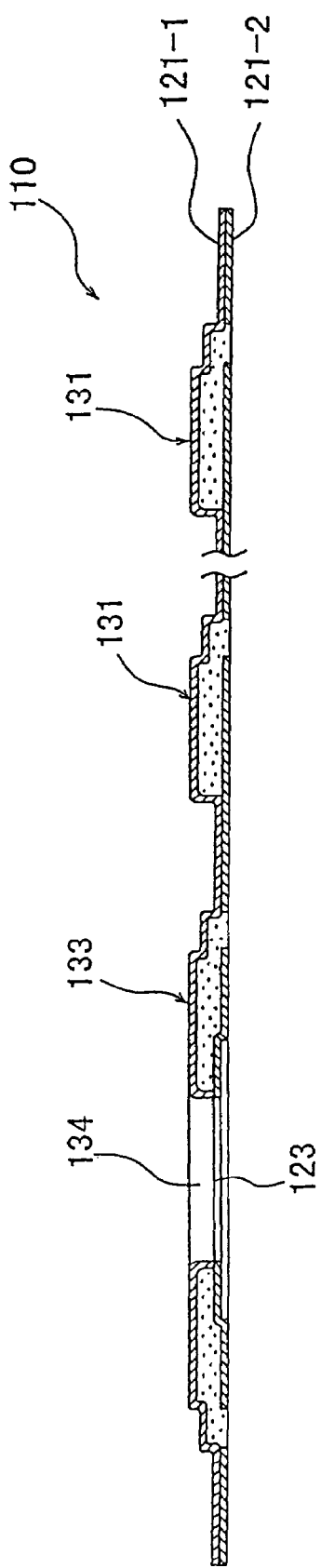
FIG. 10 is a schematic sectional view of a key top plate 110 (taken along the line D—D of FIG. 9)

FIG. 9 is a perspective view of a key top plate 110 to which the present invention is applied, and FIG. 10 is a schematic sectional view of the key top plate 110 (taken along the line D—D of FIG. 9). As shown in both diagrams, the key top plate 110 comprises a first and a second film plate 121-1, 121-2, made of transparent synthetic resin having flexibility and placed one on the other. Predetermined portions of the first film plate 121-1 disposed in an upper side is pressed upward to form recessed portions, and then transparent mold-resin is molded within the recessed portions so as to form a variety of key tops 131, 133. The key top 133 is formed in an approximately donut-like shape with a through hole 134 provided in a center thereof, and each of the two film plates 121-1 and 121-2 is also provided with a through hole 123 in a location corresponding to the through hole 134. It is to be noted that the reference numeral 140 designates a key top made of mold-resin having a flange portion 141 along a periphery thereof, which is formed in such a geometry that the flange portion 141 comes into contact with an under surface of the lower film 121-2 when the key top 140 is inserted into the through holes 134, 123.

Figure 11:
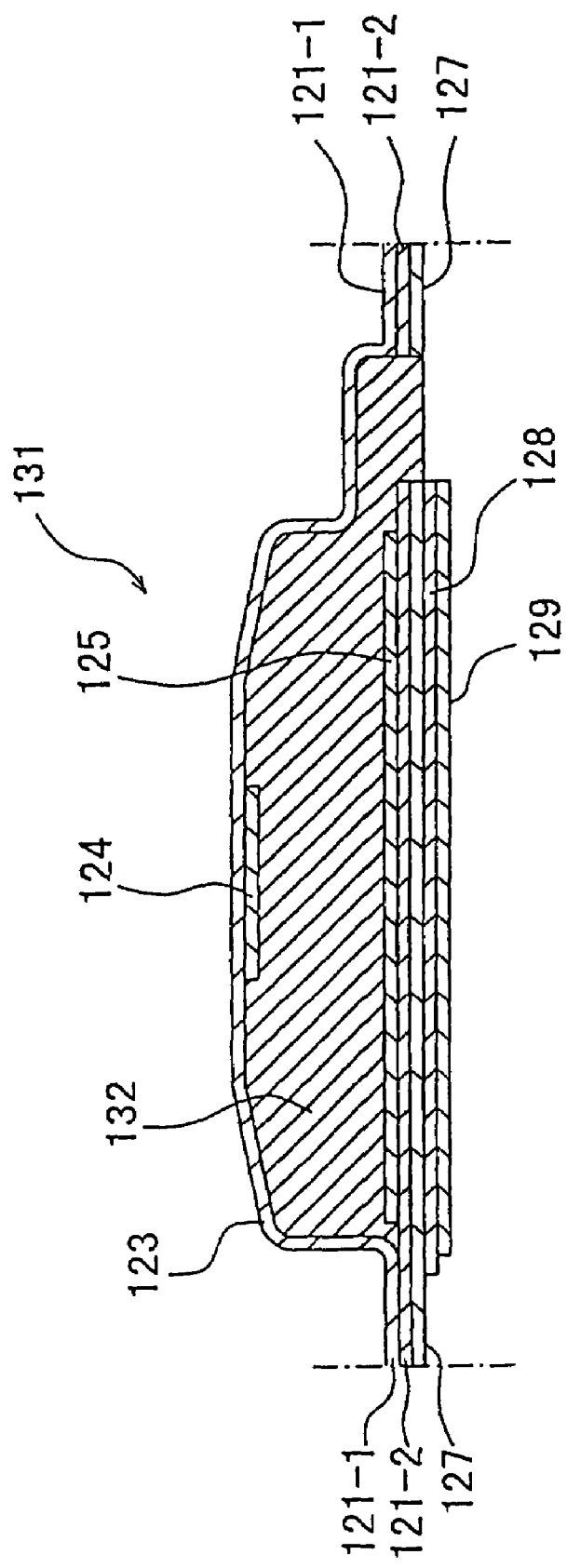
FIG. 11 is an enlarged sectional view of one key top 131.

Herein, FIG. 11 is an enlarged sectional view of one key top 131. As shown in FIG. 11, in the key top 131, a key top main body 132 made of mold-resin is molded within a recessed portion 123, which has been formed by pressing the first film plate 121-1 upward. The second film plate 121-2 is disposed on the bottom surface side of the key top 131, wherein a transparent adhesive layer 125 is printed on the top surface of the second film plate 121-2 over an area on which the key top 132 is to be arranged, and on the bottom surface of the second film plate 121-2, a transparent coating layer 127, an image print layer 128 and a hold-down print layer 129 are printed respectively in this order. The coating layer 127 is provided to improve adhesive property with the image print layer 128 and, for example, materials in a water soluble resin group or an inorganic pigment group may be used to form the coating layer 127.

Since the image print layer 128 is a color print layer but is a transparent or see-through layer, the hold-down print layer 129 of opaque color (e.g., white color) is printed beneath the image print layer 128. On the other hand, a top print layer 124 is printed on the bottom surface of the recessed portion 123 of the first film plate 121-1. The top print layer 124 includes, for example, a character, a graphical form or a symbol, which is printed, for example, by way of screen printing. Since the top print layer 124 is located above the image print layer 128 by a predetermined distance away therefrom, the top print layer 124 may appear as if it is floating over the image print layer 128 so as to enhance the decorative effect. It is to be noted that when the second film plate 121-2 and the key top main body 132 are made of the same material and have a good adhesiveness to each other, the adhesive layer 125 is not required.

Further, in this embodiment, the image print layer 128 of the second film plate 121-2 is formed by way of flexographic printing, offset printing, gravure printing, the printing by using a laser printer, printing using an ink jet printer, or printing using a thermo-transfer printer. Thus, a high-quality picture can be provided for the print layer decorating the key top plate 110, which enables even a photo-image-like printing to be readily provided. In this regard, the printing using the laser printer, the printing using the ink jet printer, and the printing using the thermo-transfer printer are grouped into a printing method, in which the printing is directly applied to the second film plate 121-2 by the printer. On the other hand, the flexographic printing, the offset printing and the gravure printing are grouped into another printing method, in which a printing plate is formed first, and then this printing plate is used to perform the printing at a high speed. It is to be noted that the hold-down print layer 129 beneath the image print layer 128 may be formed, for example, by way of the screen printing.

Figure 12:
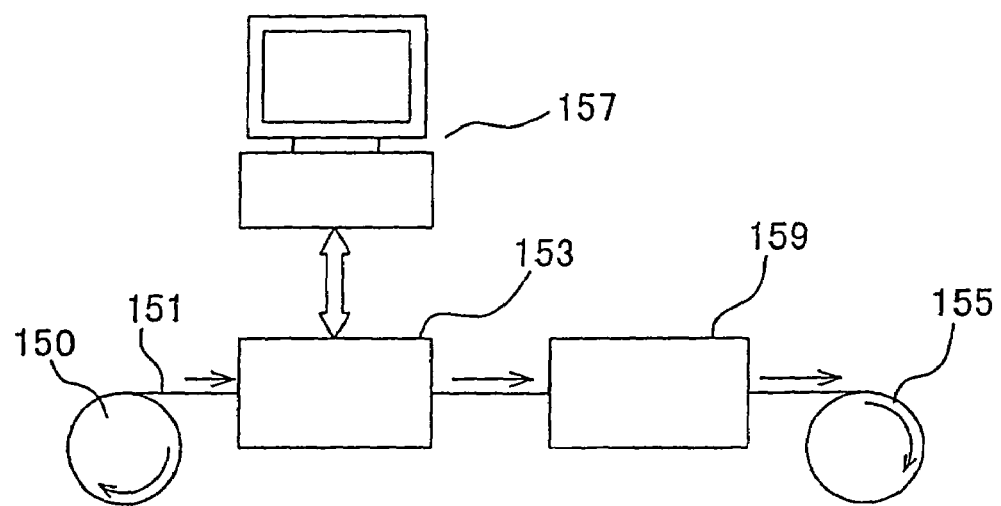
FIG. 12 is an explanatory drawing showing a method of printing on a film 151 using a printer.

To explain first the printing method in which the direct printing is applied by the printer, as shown in FIG. 12, a strip of film 151 (to be formed into the second film plate 121-2) drawn from a feed roll 150 is passed through a printer (a laser printer, an ink jet printer or a thermo-transfer printer) 153 and a screen printer 159, and then is wound up on a wind-up roll 155, in which the printer 153 is connected to a computer 157 functioning as a digital image data generation means.

The laser printer used as the printer 153 is operated theoretically based on the same principle as a copy machine. In particular, the printing is performed sequentially according to the steps of: primarily charging a surface of a photosensitive drum uniformly to positive potential (charging); secondarily exposing an area of the photosensitive drum not to be printed to the light so as to remove the electric charges from the light exposed area and thus to leave only an area to be printed as charged (exposing); thirdly applying negatively charged toner to the photosensitive drum so that the toner is attached exclusively to the positively charged area (developing); fourthly transferring the toner on the photosensitive drum to a sheet (transferring); then applying heat and pressure to the transferred toner on the sheet so that the toner can be deposited to the sheet (fixing); and finally exposing the photosensitive drum to the light so that the charged photo sensitive drum returns back to the original condition (static elimination). In the case of color printing, several types of methods may be employed including, for example, a first method in which four photosensitive drums for respective four-colors are provided so as to transfer each toner of four colors from each of the four drums to the same sheet. A second method can be employed, in which a transfer belt is arranged between the photosensitive drum and the sheet, so that four different toners are developed individually in totally four times on the single photosensitive drum and these toners of four colors are printed on the transfer belt with one on another, and then the toners of the four colors are transferred from this transfer belt to the sheet all at once.

The ink jet printer used as the printer 153 is designed to perform a printing operation in such a way that recording liquid is discharged through a thin orifice in a form of minute liquid drops under a control of an image signal so as to be applied to a recording paper. This printing method is generally categorized into two methods: an on-demand method, in which a liquid drop is generated only when data exists; and a continuous method, in which the liquid drops are serially generated and the direction of discharge is varied depending on data so as to record the data.

The thermo-transfer printer used as the printer 153 employs a method for performing the printing operation, in which a film with ink having been applied thereto is heated by using a thermo-sensitive recording head so as to transfer the ink onto plain paper.

The computer 157 uses software for image processing to generate digital image data indicative of a desired design (shape, pattern and color) to be printed. Then, the digital image data is output to the printer 153 so as to print the design serially onto the film 151. Since either the laser printer, the ink jet printer, or the thermo-transfer printer can be used for the color printing, and more advantageously it can perform the printing by using a variety of coloring with high-quality, a high image quality can be readily generated with high reproducibility even for photo-image like printing. In addition, the printing plate required for other printing methods is no more necessary for either of the printers and, thus, the equipment for the printing plate can be reduced, while the design can be changed simply by modifying the digital image data generated in the computer 157 and outputting the modified image data to the printer 153. Then, the hold-down layer 129 is screen-printed by using the screen printer 159, and the film is wound up on the wind-up roll 155.

Then, to explain another method of forming the image print layer 128 of the second film plate 121-2, in which the printing plate is formed first and then that printing plate is used to perform the printing at high speed, primarily, a digital image data indicative of a desired design (shape, pattern and color) to be printed is generated by using image processing software in a computer, though not shown, and then the digital image data is used to fabricate the printing plate. This printing plate is then used as a printing cylinder in the printing process for the flexographic printing, the offset printing or the gravure printing.

Figure 13A:
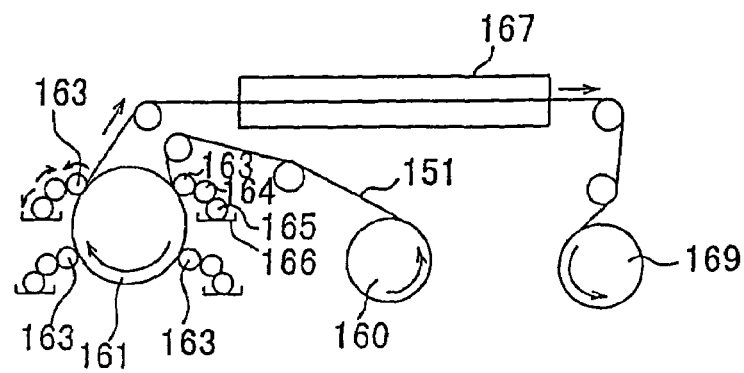
FIG. 13(a), FIG. 13(b) and FIG. 13(c) are explanatory schematic drawings, respectively, showing methods of printing on the film 151 using printers.

That is, in the case of flexographic printing, as shown in FIG. 13(a), a multi-color printing is applied to a film 151 wound off a roll 160 in a region rolling over an impression cylinder 161 by means of four groups of printing cylinders 163 with different inks so as to form the image print layer 128 and the hold-down print layer 129. Then, the film 151 is passed through a drying equipment 167 and wound up on the wind-up roll 169. Each group of printing cylinders 163 is supplied with the ink from an inking roller 165 via an anilox roller 164. Reference numeral 166 designates an ink tank for supplying the ink to the inking roller 165.

Figure 13B:
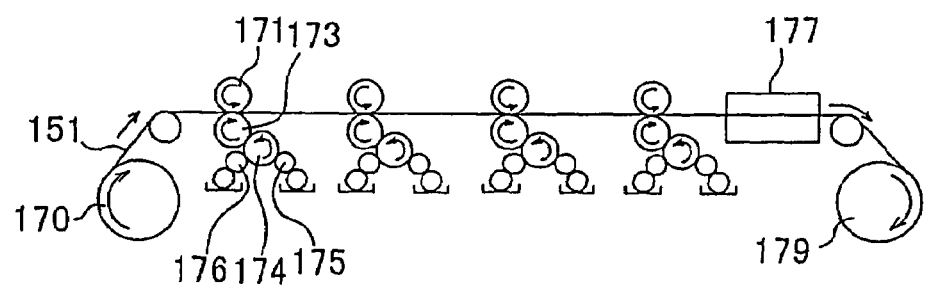

In the case of offset printing, as shown in FIG. 13(b), a multi-color printing is applied to a film 151 wound off a roll 170 by passing it through between four pairs of impression cylinders 171 and blanket rollers 173, each pair applying thereto different colors, so as to accomplish a multi-color printing and thus to form the image print layer 128 and the hold-down layer 129. Then, the film 151 is passed through drying equipment 177 and wound up on a wind-up roll 179. Each blanket roller 173 is in contact with a printing cylinder 174, which in turn is in contact with an inking roller 175 and a dampening roller 176.

Figure 13C:
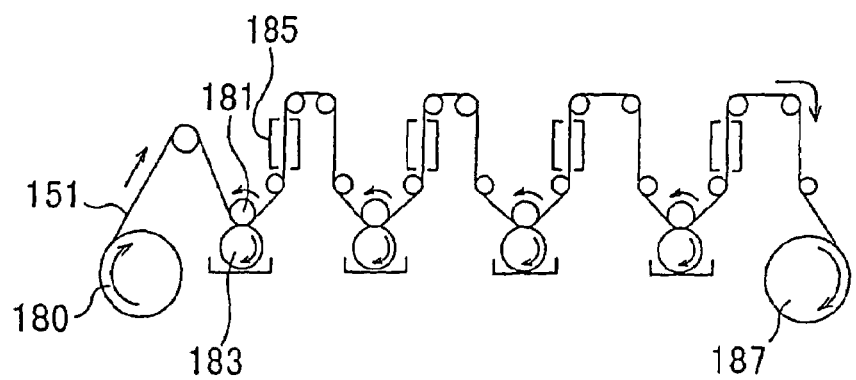

In the case of gravure printing, as shown in FIG. 13(c), the printing is applied to a film 151 wound off the roll 180 by means of an impression cylinder 181 and a printing cylinder 183 and then the film 151 is dried in drying equipment 185. These printing and drying processes are repeated four times, and then the film 151 is wound up on a wind-up roll 187.

Since either of those printing methods can be used for the color printing and more advantageously, the printing can be performed by using a variety of coloring with high-quality, even photo-image like printing can be readily generated with high reproducibility in color tone. Although these printing methods require a printing plate, they can handle a large volume of printing at a high speed, which is advantageous in mass production. It is to be appreciated that the design can be easily changed only by modifying the digital image data generated by the computer and producing a new printing cylinder therefor.

After the printing operation onto the second film plate 121-2 has been completed, then, as shown in FIG. 14(a), the adhesive layer 125 is printed over the second film plate 121-2 on its opposite side with respect to the image print layer 128, and a through hole 145 is formed in a predetermined location of the second film plate 121-2.

On the other hand, as to the first film plate 121-1, the top print layer 124 is provided by way of, for example, the screen printing before the forming of the recessed portion 123, as shown in FIG. 14(b-1). Then, an adhesive layer (though not shown) is printed entirely over a specific area of the first film plate 121-1 which is defined on the bottom surface thereof and is to be formed into the recessed portion 123 in the subsequent step. Then, the first film plate 121-1 is drawn by using a die so as to form the recessed portion 123. In this regard, the reason why the screen printing method has been used for printing the top print layer 124 is that the screen printing is not fully sufficient for printing in multi-coloring with high quality, but is capable of forming a thick print layer. Therefore, the print layer 124 can be readily expanded in association with the first film plate 121-1 when it is expanded upon forming the recessed portion 123 after the printing thereon, thereby eliminating occurrence of any faulty print.

Figure 14C:
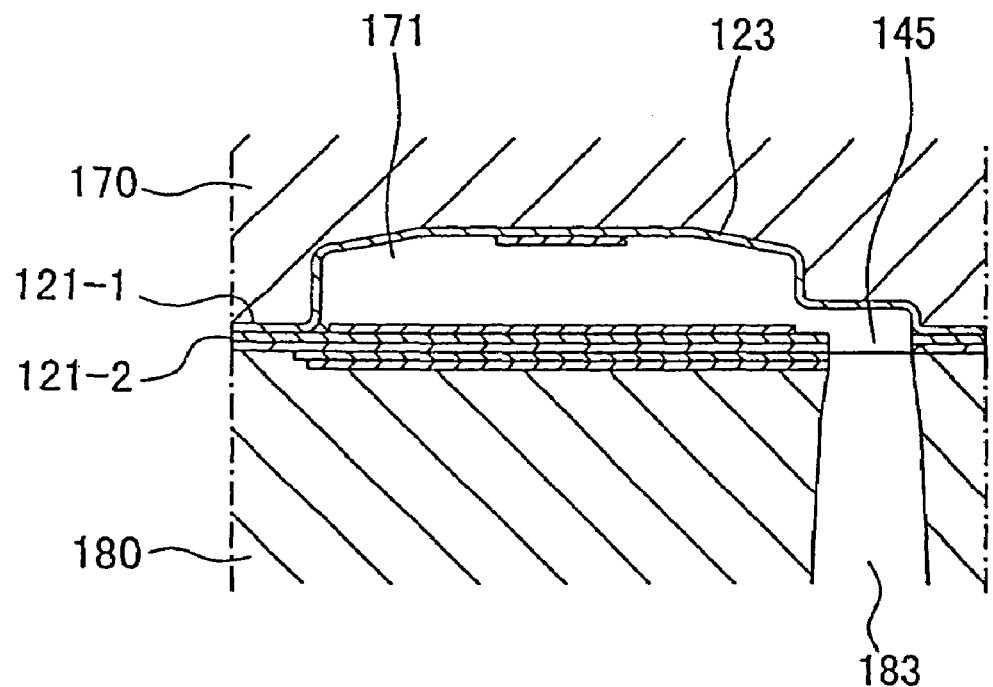
FIG. 14(c) and FIG. 14(d) are explanatory sectional views showing a method of manufacturing the key top plate 10.

In the next step, the two films 121-1 and 121-2 are joined by placing one on the other and then are clamped between a first and a second dies 170, 180, as shown in FIG. 14(c). The first die 170 is provided with a cavity 171 formed in a shape to accommodate the recessed portion 123 of the first film plate 121-1. A pin gate 183 is formed in the second die 180 at a location to be joined to the through hole 145 of the second film plate 121-2.

Figure 14D:
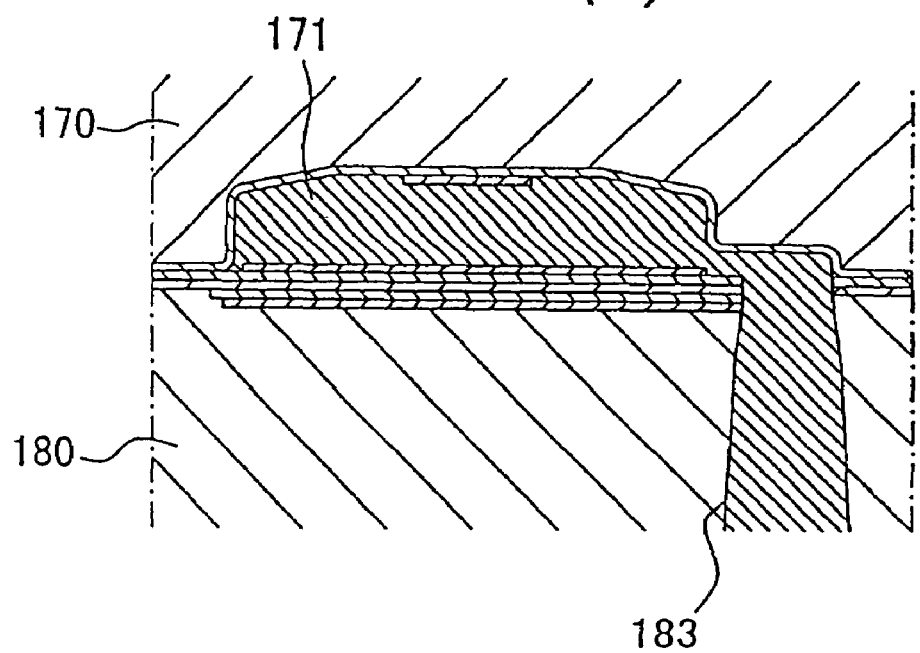

Then, under this condition, molten resin is injected from the pin gate 183 to fill up the space within the cavity 171 with the molten resin as shown in FIG. 14(d). After the molten resin has been set, the first and the second dies are removed to obtain the completed key top plate shown in FIGS. 9 to 11.

It is to be appreciated that the first film plate 121-1 may be provided with the print layer by way of various printing methods as described above other than the screen printing, such as flexographic printing and offset printing.

FOURTH EMBODIMENT

Figure 15A:
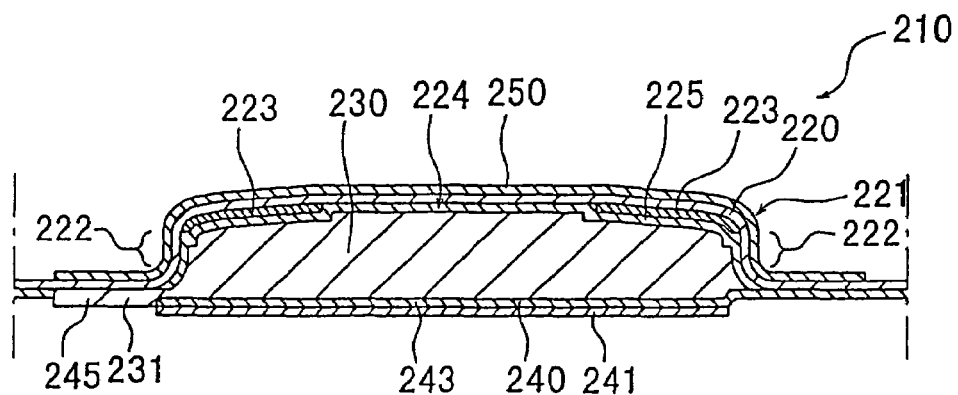
FIG. 15(a) is a schematic sectional view (taken along the line E—E of FIG. 15(b)) and FIG. 15(b) is a plan view.
Figure 15B:
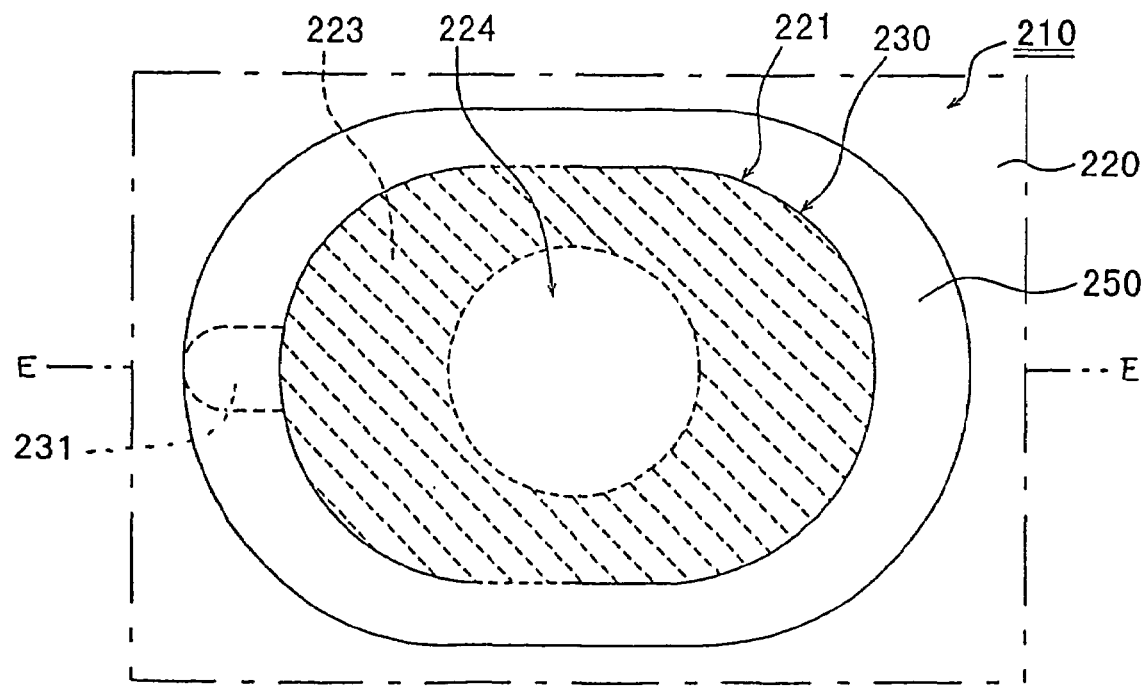

FIG. 15 is an enlarged schematic view of a principal part of a key top plate 210 showing one key top 230 and surroundings thereof, according to a fourth embodiment of the present invention, wherein FIG. 15(a) is a schematic sectional view (taken along the line E—E of FIG. 15(b)) and FIG. 15(b) is a plan view. It is to be noted that the actual key top plate 210 includes a plurality of key tops 230. Besides, for illustrative purposes, each element is shown in a considerably larger scale than its actual size in thickness (the same is applicable to each of the drawings for the other embodiments cited in this specification).

As shown in FIG. 15, the key top plate 210 has been configured in such a way that a first film plate 220 with a decorative layer 223 or the like attached on a bottom surface thereof is pressed upward to form a recessed portion 221, a key top 230 is molded within the recessed portion 221, and a second film plate 240 is arranged on the bottom surface of the key top 230. In other words, this key top plate 210 has a configuration in which the first film plate 220 and the second film plate 240 are attached, respectively, on the top surface and the bottom surface of the key top 230 made of mold-resin so as to encapsulate the key top 230. Further, the first film plate 220 is provided with a decorative layer 223 and an adhesive layer 225 formed on a bottom surface of layer 223, and also a decorative layer 241 is formed on an under surface of the second film plate 240. In addition, a protection film 250 is attached onto the top surface of the recessed portion 221 of the first film plate 220 to protect the portion. Each of the components will now be described below.

The first film plate 220 is made of transparent (or translucent) resin film having flexibility, and polyethylene terephthalate film (PET film) has been used in this embodiment. Of course, other resin films made of variety of materials may be used. Herein, a portion of the first film plate 220 covering the key top 230 is formed into the recessed portion 221 with the same shape as that of the top surface of the key top 230, and the decorative layer 223 and the adhesive layer 225 are formed on the bottom surface of the recessed portion 221. The decorative layer 223 is a deposition layer of aluminum or the like in this embodiment, which is provided with a key top exposing section 224 defined in an inner area (in its center) thereof by arranging no decorative layer 223 in this area for exposing the key top 230 located beneath. Although the key top exposing section 224 is circular in this embodiment, it is needless to say that various modifications may be applied to the shape of the section 224.

The decorative layer 223 is arranged on the bottom surface of the recessed portion 221 of the first film plate 220. This decorative layer 223 has a metallic color tone and is made of material having a mirror-face appearance, and this embodiment has employed a deposition film of aluminum (silver color). Of course, various other materials, such as nickel, titanium, chrome and the like, may be used for deposition. This decorative layer 223 may be formed by way of a vacuum deposition method, an ion plating method, a sputtering method and so forth. In this embodiment, the decorative layer 223 has been deposited into such a condition that blocks the visible light from passing therethrough (but, of course, it may be deposited into such a condition that permits the visible light to pass through). Besides, the decorative layer is not necessarily made up of a deposition layer, but may be made by printing paints composed of various different coloring. Further, the decorative layer 223 is not arranged in a side face portion 222 of the recessed portion 221 of the first film plate 220, thereby allowing the first film plate 222 to adhere directly to the key top 230 via the adhesive layer 225.

The adhesive layer 225 is transparent (or translucent) and made of material adhering to the decorative layer 223 and/or the first film plate 220 upon molding the key top 230 of mold-resin (e.g., polyester or urethane).

The key top 230 is made of a transparent (or translucent) thermoplastic material, and polycarbonate resin is used in this embodiment. Of course, various other mold-resins may be used.

The second film plate 240 is composed of transparent (or translucent) resin film having flexibility, and a polycarbonate film has been used in this embodiment. Of course, other resin films made of various materials may be used. Herein, a portion of the second film plate 240, which comes into contact with the key top 230 (in particular, an entire area facing the under surface of the key top 230), protrudes downward from a peripheral portion thereof, which is located outside of the key top 230 and is out of contact therewith, to form a protruded portion 243, and the decorative layer 241 is formed on an under surface of the protruded portion 243. The decorative layer 241 according to this embodiment may be provided in the form of, for example, a solid print (i.e., a single color printing applied to almost entire area of the protruded portion 243 facing to the under surface of the key top 230), and may be printed with an appropriate color (e.g., white) and thickness so as to permit light transmission. In this embodiment, since the decorative layer 241 is printed on a film designated as the second film plate 240, the thickness of the decorative layer 241 formed by the printing can be readily made thinner, thereby easily accomplishing the decorative layer of light transmissible type. It is to be appreciated, however, that the decorative layer 241 may be printed by using material and thickness which blocks the light transmission, or otherwise may be a decorative layer composed of a deposition layer. Further, the decorative layer 241 may not necessarily be provided in the form of a solid print, but may be printed to form a predetermined pattern on the second film plate 240. It is to be noted that a through hole 245 is formed in a part of the protruded portion 243, and the portion defining this through hole 245 is covered with a protrusion 231 in a shape of a tongue tip which protrudes from the periphery of the key top 230.

The protection film 250 is made of transparent flexible resin film, and a PET film has been used in this embodiment. Of course, resin films made of other various materials may be used. The protection film 250 is formed into a shape and size suitable for covering the top surface of the recessed portion 221 of the first film plate 220, and is attached to the first film plate 220 by an adhesive material with light adhesiveness.

The key top plate 210 fabricated with the configuration as described above may provide an improved aesthetic appearance in design from the point that, when viewed from above, the circumferential portion of the top surface of the key top 230 is decorated by the decorative layer 223, while the key top is exposed through the key top exposing section 224 surrounded by the decorative layer 223. Therefore, the underlying decorative layer 241 can be seen through the interior of the transparent key top 230.

Further, in the case where the decorative layer 241 has been printed so as to permit light transmission, if a light emitting means such as a light emitting diode or the like is provided beneath the key top plate 210, the key top exposing section 224 of the first film plate 220 may be illuminated brightly over the top surface of the key top plate 210 through the transparent second film plate 240, the key top 230, and the first film plate 220. At the same time, this illumination creates a three-dimensional effect and high-class appearance such that the color pattern of the decorative layer 241 can be seen as if it was floating over the bottom surface of the key top 230, thereby further improving the aesthetic appearance in design.

Further, according to the configuration of this embodiment, since the key top 230 made of mold-resin is covered with the first and the second film plates 220, 240, there is no fear that the key top 230 might be removed from the first and the second film plates 220, 240.

Further, when a switch contact (though not shown) is arranged beneath the key top plate 210 and then the key top 230 is pressed, the switch contact is turned on.

A method of manufacturing the key top plate 210 will now be described. FIG. 16 shows how to manufacture the key top plate 210. First of all, a film plate with a deposition layer of aluminum deposited over an entire area of one surface (the bottom surface) is prepared, and then this deposition layer is selectively etched so as to produce a film plate 220 having the underlying decorative layer 223 consisting of the deposition layer disposed on the bottom surface thereof (the decorative layer 223 including the key top exposing section inside thereof) as shown in FIG. 16(a-1).

Subsequently, the adhesive layer 225 is formed on the bottom surface of the film plate 220 by printing, as shown in FIG. 16(a-2). On the other hand, the protection film 250 is attached to the film plate 220 by using an adhesive material with light adhesiveness in a specified area of the top surface of the film plate 220 where the recessed portion 221 is to be formed.

Then, a portion of the film plate 220 under which the key top 230 is to be arranged is drawn by using a die so as to be convexly deformed upwardly and finally to be formed into the recessed portion 221 (pre-forming), as shown in FIG. 16(a-3). The shape of the recessed portion 221 should be made generally identical to the shape of the top surface of the key top 230 (or, it is not necessarily the same, but may have a height equivalent to, for example, one half of the depth of a cavity 271 of a die 270, which will be described later.

On the other hand, a second film plate 240 is prepared and a decorative layer 241 in the form of, for example, a solid print with a light transmissible color and thickness, is printed on the bottom surface thereof. Then, the through hole 245 is formed in the predetermined location of the second film plate 240. Subsequently, a portion of the second film plate 240 which is to come in contact with the bottom surface of the key top 230 is drawn by using a die to protrude downward and thus to be formed into the protruded portion 243, as shown in FIG. 16(b). The shape of the protruded portion 243 is identical to the shape of the bottom surface of the key top 230.

Figure 16C:
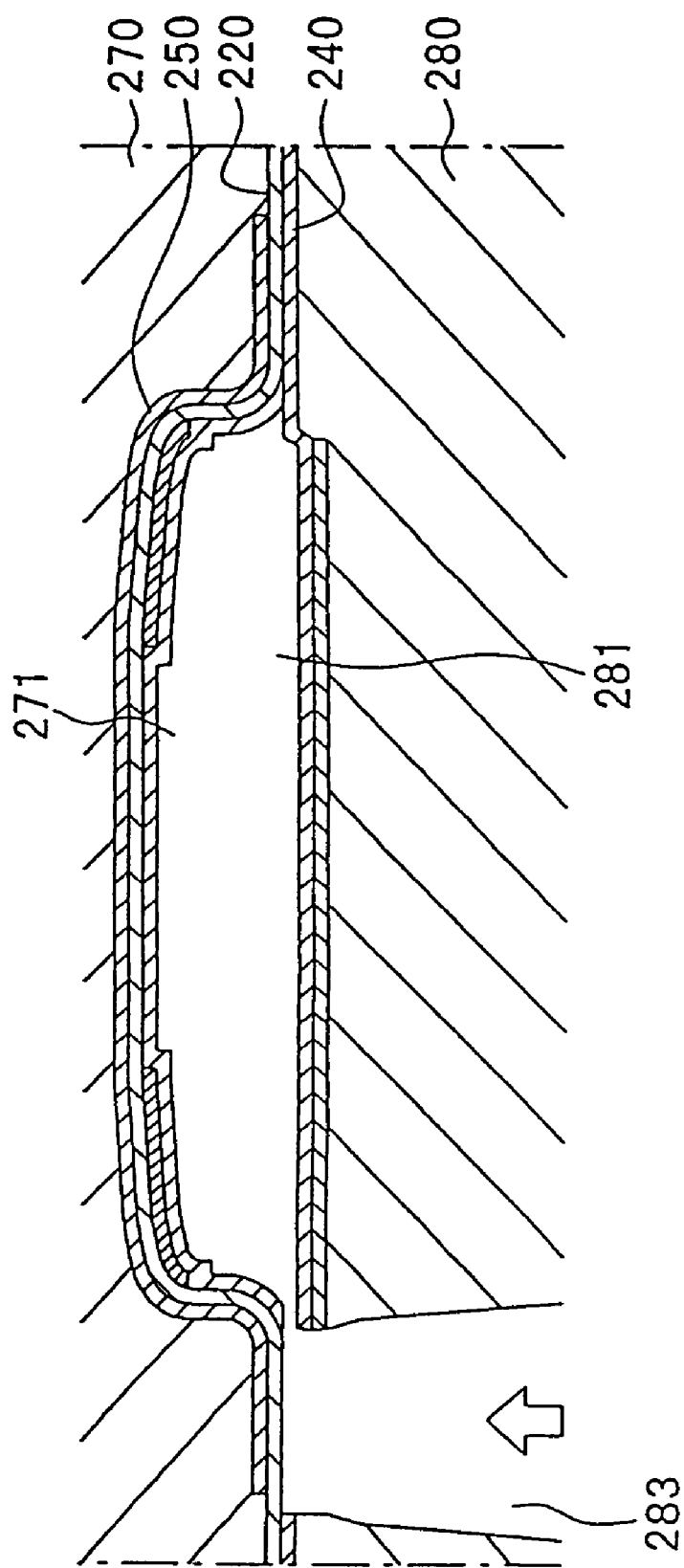

In the next step, the first and the second films 220, 240 are joined by placing one on the other, and are then clamped between the first and the second dies 270, 280 as shown in FIG. 16(c). The first die 270 is provided with a cavity 271 formed into a shape to accommodate the recessed portion 221 of the first film plate 220 (that is, a shape identical with that of the upper portion of the key top 230). On the other hand, the second die 280 is provided with a cavity 281 in a shape to accommodate the protruded portion 243 of the second film plate 240 (that is, a shape identical with that of the lower portion of the key top 230), and is also provided with a pin gate 283 disposed in a location to be joined with the through hole 245 of the second film plate 240.

Then, under this condition, molten resin is injected through the pin gate 283 to fill up the space within both cavities 271, 281 of the first and the second dies 270, 280 with molten resin. After the molten resin has been set, the first and the second dies are removed to obtain the completed key top plate 210 as shown in FIG. 15.

It is to be noted that the adhesion of the first film plate 220 with the key top 230 is made by the adhesive material layer 225 in this embodiment. However, the second film plate 240 and the key top 230, which are both made of polycarbonate, can be bonded to each other with heat and pressure from the molten resin even without using adhesive material.

In the manufacturing process described above, when the recessed portion 221 is formed in the first film plate 220 and also when the molten resin is injected into the recessed portion 221, the first film plate 220 is subject to stress such as strong expanding and/or contracting forces and heat and pressure applied thereto, which leads to a fear that the first film plate 220 and the decorative layer 223 consisting of deposition layer, which have been bonded to each other by relatively lower adhesive strength, might be separated or stripped from each other due to the stress. However, in this embodiment, the side face portion 222 of the recessed portion 221 of the first film plate 220 remains without applying the decorative layer 223 thereto. Therefore, the first film plate 220 may be directly bonded to the key top 230 at this side face portion 222 defining an outer side surface of the key top 230, thereby providing high adhesive strength therebetween, which ensures that the separation of the key top 230 from the first film plate 220 is prevented.

It is to be appreciated that if the same material is used to make the first film plate 220 and the key top 230. (that is, both are made of, for example, polycarbonate), the heat and pressure from the molten resin can provide a strong adhesion to the direct contact site between the first film plate 220 and the key top 230 without using the adhesive layer 225. Further, if the adhesive material is mixed in the molten resin forming the key top 230, the first film plate 220 and the key top 230, even if they are made of different materials, can be bonded to each other directly without using the adhesive material 245.

Although there is a fear that a scar or a dent may be produced on the surface of the recessed portion 221 of the first film plate 220 during its manufacturing process, the surface of the recessed portion 221 in this embodiment is free from such fear of scar or dent since the surface of the recessed portion 221 is covered with the protection film 250. The protection film 250 may be peeled off upon shipping of the key top plate 210 or when the key top plate 210 is assembled on a product.

It is to be appreciated that various modifications may be made to the manufacturing method of the key top plate 210. For example, an alternative method may be provided, in which the pre-forming step, which has been applied to the first film plate 220 before the step of molding of the key top 230 in the above embodiment, may be omitted. In that case, the key top plate 210 may be manufactured by the steps of: clamping the planar sheet-like film plate 220 shown in FIG. 16(*a*-2) directly by the first and the second dies 270, 280 shown in FIG. 16(*c*); and injecting the molten resin against the flat film plate 220 and thereby into the cavities 271, 281 so as to expand the first film plate 220 to the inner wall face of the cavity 271 and to form the recessed portion 221.

Further, although in this embodiment the decorative layer 223 made of deposition layer has been disposed on the bottom surface of the recessed portion 221, a light transmissible decorative layer may be additionally arranged beneath the decorative layer 223 so as to cover the key top exposing section 224, thereby providing the key top exposing section 224 of a predetermined coloring.

Further, although in this embodiment the decorative layers 223 and 241 have been disposed on the bottom surface of the first and the second film plates 220, 240, respectively, they may be disposed on the top surface side of the first and the second film plates 220, 240. In addition, the decorative layer 241 may be omitted.

FIFTH EMBODIMENT

Figure 17:
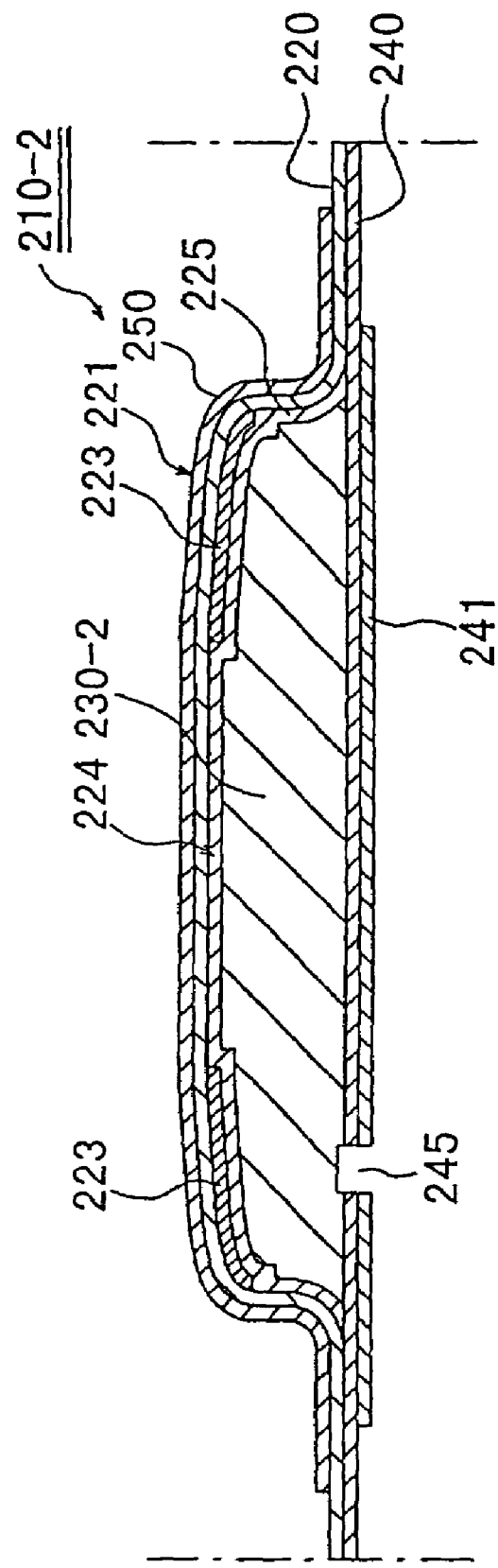
FIG. 17 is an enlarged schematic view of a principal part of a key top plate 10-2 showing a key top 30-2 and surroundings thereof, according to a fifth embodiment of the present invention.

FIG. 17 is an enlarged schematic sectional view of a principal part of a key top plate 210-2 showing one of the key tops 230-2 and surroundings thereof. A different point in this key top plate 210-2 from the key top plate 210 shown in preceding FIG. 15 is that a second film plate 240 is made flat with no protruded portion 243, and a through hole 245 is arranged right beneath the decorative layer 223, thereby eliminating a protrusion 231 in the shape of tongue tip. With such a configuration, since the through hole 245 is located right beneath the decorative layer 223, it is almost invisible from above the key top 230-2, thus causing no problem therefrom.

The present invention may be carried out in various forms without departing from the spirit or the principal features thereof. Therefore, those embodiments described above have been presented only for illustrative purposes in all respects, but are not intended to limit the invention. The scope of the present invention will be defined only by the appended claims, but not restricted by any text in the specification. Furthermore, any variations or modifications that reside in the equivalent to the scope of the claims are considered to be included in the scope of the present invention.

What is claimed is:

1. A key top plate comprising:
   a first flexible transparent resin film plate having an upwardly-deformed recessed portion;
   a key top made of transparent thermoplastic mold-resin within said recessed portion of said first resin film plate so that said first resin film plate is on an upper surface of said key top; and
   a second flexible transparent resin film plate on a lower surface of said key top;
   said key top, said first resin film plate, and said second resin film plate being shaped and arranged to define a protrusion extending outwardly from a lower circumferential portion of said key top so as to allow injection of said thermoplastic mold-resin in a molten state between said first resin film plate and said second resin film plate and into said recessed portion.

2. The key top plate of claim 1, wherein one of said first resin film plate and said second resin film plate has a through-hole at said protrusion for allowing injection of said thermoplastic mold-resin in a molten state.

3. The key top plate of claim 1, further comprising a decorative layer on said first resin film plate and/or said second resin film plate.

4. The key top plate of claim 3, wherein said decorative layer includes a character, a graphical form, or a symbol.

5. The key top plate of claim 3, wherein said decorative layer comprises a print layer printed by flexographic printing, offset printing, gravure printing, printing with a laser printer, printing with an ink jet printer, or printing with a thermo-transfer printer.

6. The key top plate of claim 5, further comprising a coating layer on a surface of said first resin film plate and/or said second resin film plate on which said print layer is located so as to improve a fixing property of said print layer.

7. The key top plate of claim 3, wherein said decorative layer consists of a deposition film.

8. The key top plate of claim 3, wherein said decorative layer is arranged on said first resin film plate, further comprising a key top exposing section on said first resin film plate, said key top exposing section being free of any decorative layer so as to allow said key top to be viewed through said first resin film plate.

9. The key top plate of claim 8, wherein said decorative layer is also arranged on said second resin film plate.

10. The key top plate of claim 1, wherein said second resin film plate has a peripheral portion not contacting said key top, and has a protruding portion contacting said key top and protruding downward from said surrounding peripheral portion.

11. The key top plate of claim 1, wherein said second resin film plate has a peripheral portion not contacting said key top, and has a flat portion contacting said key top and being flush with said surrounding peripheral portion.

12. The key top plate of claim 1, wherein said protrusion comprises an upwardly-protruding peripheral portion of said first resin film plate surrounding said key top.

13. The key top plate of claim 1, wherein said first film plate and/or said second film plate has a cover section covering said key top, a hinge section extending outward from said cover section, and a fixing section located at a side of said hinge section so as to secure said key top plate to another member.

14. The key top plate of claim 1, wherein said first resin film plate directly contacts said upper surface of said key top without any adhesive material therebetween, and said second resin film plate directly contacts said lower surface of said key top without any adhesive material therebetween.

* * * * *